United States Patent
Takeda et al.

(10) Patent No.: US 11,327,091 B2
(45) Date of Patent: *May 10, 2022

(54) METHOD FOR INSTALLING INERTIAL SENSOR UNIT, AND INERTIAL SENSOR UNIT

(71) Applicant: Seiko Epson Corporation, Tokyo (JP)

(72) Inventors: Kazuyoshi Takeda, Chino (JP); Hiroshi Okamoto, Shiojiri (JP)

(73) Assignee: Seiko Epson Corporation

(*) Notice: Subject to any disclaimer, the term of this patent is extended or adjusted under 35 U.S.C. 154(b) by 0 days.

This patent is subject to a terminal disclaimer.

(21) Appl. No.: 16/886,864

(22) Filed: May 29, 2020

(65) Prior Publication Data
US 2020/0379002 A1 Dec. 3, 2020

(30) Foreign Application Priority Data

May 31, 2019 (JP) .............................. JP2019-102213

(51) Int. Cl.
| | | |
|---|---|---|
| *G01P 15/097* | (2006.01) | |
| *G01P 1/02* | (2006.01) | |
| *G01P 15/09* | (2006.01) | |
| *G01P 15/18* | (2013.01) | |

(52) U.S. Cl.
CPC ............ *G01P 15/097* (2013.01); *G01P 1/023* (2013.01); *G01P 15/09* (2013.01); *G01P 15/18* (2013.01)

(58) Field of Classification Search
CPC .......... G01P 1/02; G01P 1/023; G01P 15/097; G01P 15/09; G01P 15/18; G01P 15/08; G01P 15/02
See application file for complete search history.

(56) References Cited

U.S. PATENT DOCUMENTS 3,610,973 A * 10/1971 Bauer .................. G01R 31/343
310/15
4,562,740 A * 1/1986 Webber .................. G01H 11/08
29/25.35

(Continued)

FOREIGN PATENT DOCUMENTS

| JP | H02-008715 A | 1/1990 |
| JP | H07-139994 A | 6/1995 |

(Continued)

OTHER PUBLICATIONS

English Translation of JP2020-139756.*

*Primary Examiner* — Helen C Kwok

(74) *Attorney, Agent, or Firm* — Harness, Dickey & Pierce, P.L.C.

(57) ABSTRACT

A method for installing an inertial sensor unit includes: attaching a substrate to a structure with a magnet; and attaching a case accommodating an inertial sensor, to the substrate. The case is provided with a first attachment part. The substrate is provided with a second attachment part. In the attaching the case, the first attachment part and the second attachment part are fitted together to attach the case to the substrate. The inertial sensor has a base part, a moving part coupled to the base part, a physical quantity detection element arranged at the moving part, and a mass part arranged at the moving part. The mass part is made of a non-magnetic material.

8 Claims, 15 Drawing Sheets

(56) References Cited

U.S. PATENT DOCUMENTS

| | | | | |
|---|---|---|---|---|
| 5,029,474 A | * | 7/1991 | Schulze | ............. G10K 11/02 |
| | | | | 73/587 |
| 5,269,185 A | | 12/1993 | Froidevaux | |
| 2005/0081628 A1 | * | 4/2005 | Nozoe | ............. G01C 19/56 |
| | | | | 73/494 |
| 2019/0353506 A1 | | 11/2019 | Yoda | |
| 2020/0124633 A1 | * | 4/2020 | Takeda | ............. G01P 1/02 |

FOREIGN PATENT DOCUMENTS

| | | | |
|---|---|---|---|
| JP | 2003-287436 | * | 10/2003 |
| JP | 2014-085233 A | | 5/2014 |
| JP | 2020-139756 | * | 9/2020 |
| WO | 2014-123144 A1 | | 8/2014 |

* cited by examiner

METHOD FOR INSTALLING INERTIAL SENSOR UNIT, AND INERTIAL SENSOR UNIT The present application is based on, and claims priority from, JP Application Serial Number 2019-102213, filed May 31, 2019, the disclosure of which is hereby incorporated by reference herein in its entirety.

BACKGROUND

1. Technical Field

The present disclosure relates to a method for installing an inertial sensor unit, and an inertial sensor unit.

2. Related Art

According to the related art, inertial sensors such as an acceleration sensor detecting an acceleration and a gyro sensor detecting an angular velocity are known.

For example, JP-A-2014-85233 describes an acceleration sensor having a tuning fork-type vibrator element formed of quartz crystal. JP-A-2014-85233 also describes that a mass part made of a metal is provided at a moving part of the acceleration sensor.

An inertial sensor unit including an inertial sensor as described above is installed at a structure such as a building in order to detect vibration of the structure. When the inertial sensor unit is installed with a magnet, an impact due to an instantaneous pull of the magnet may be applied to the inertial sensor.

However, JP-A-2014-85233 does not describe how an unwanted impact applied to the inertial sensor when the inertial sensor unit is installed at a structure such as a building with a magnet can be reduced. Also, for example, when a ferromagnetic material such as iron, nickel or cobalt is used as the mass part provided at the moving part of the acceleration sensor, for example, the mass part and the magnet for attachment attract each other. This obstructs the movement of the moving part when an acceleration is applied. Similarly, in a gyro sensor, the mass part and the magnet for attachment attract each other and this obstructs the movement of the vibrating arm. Therefore, there are cases where a physical quantity such as an acceleration or angular velocity cannot be detected.

SUMMARY

An aspect of a method for installing an inertial sensor unit according to the present disclosure includes: attaching a substrate to a structure with a magnet; and attaching a case accommodating an inertial sensor, to the substrate. The case is provided with a first attachment part. The substrate is provided with a second attachment part. In the attaching the case, the first attachment part and the second attachment part are fitted together to attach the case to the substrate. The inertial sensor has a base part, a moving part coupled to the base part, a physical quantity detection element arranged at the moving part, and a mass part arranged at the moving part. The mass part is made of a non-magnetic material.

Another aspect of a method for installing an inertial sensor unit according to the present disclosure includes: attaching a substrate to a structure with a magnet; and attaching a case accommodating an inertial sensor, to the substrate. The case is provided with a first attachment part. The substrate is provided with a second attachment part. In the attaching the case, the first attachment part and the second attachment part are fitted together to attach the case to the substrate. The inertial sensor has a base part, a vibrating arm coupled to the base part, a physical quantity detection element arranged at the vibrating arm, and a mass part arranged at the vibrating arm. The mass part is made of a non-magnetic material.

In the aspect of the method for installing an inertial sensor unit, the mass part may be made of phosphor bronze, aluminum, manganese, platinum, copper, gold, silver, zinc, lead, or glass.

In the aspect of the method for installing an inertial sensor unit, the magnet may be attached to the substrate with a screw and an adhesive.

In the aspect of the method for installing an inertial sensor unit, as the magnet, three or more magnets may be provided, and in the attaching the case, the case may be attached to the substrate in such a way that the inertial sensor is surrounded by a line connecting the three or more magnets, as viewed in a plan view from a direction in which the substrate and the case overlap each other.

In the aspect of the method for installing an inertial sensor unit, in the attaching the substrate, the substrate may be attached in such a way that an adjustment plate is located between the magnet and the structure, and the adjustment plate may be made of a material that is not mutually attractive to the magnet and not mutually repellent to the magnet.

An aspect of an inertial sensor unit according to the present disclosure includes: a substrate; a magnet provided at the substrate and attaching the substrate to a structure; and a case accommodating an inertial sensor. The case is provided with a first attachment part. The substrate is provided with a second attachment part. The first attachment part and the second attachment part are fitted together. The inertial sensor has a base part, a moving part coupled to the base part, a physical quantity detection element arranged at the moving part, and a mass part arranged at the moving part. The mass part is made of a non-magnetic material.

Another aspect of an inertial sensor unit according to the present disclosure includes: a substrate; a magnet provided at the substrate and attaching the substrate to a structure; and a case accommodating an inertial sensor. The case is provided with a first attachment part. The substrate is provided with a second attachment part. The first attachment part and the second attachment part are fitted together. The inertial sensor has a base part, a vibrating arm coupled to the base part, a physical quantity detection element arranged at the vibrating arm, and a mass part arranged at the vibrating arm. The mass part is made of a non-magnetic material.

In the aspect of the inertial sensor unit, the mass part may be made of phosphor bronze, aluminum, manganese, platinum, copper, gold, silver, zinc, lead, or glass.

In the aspect of the inertial sensor unit, the magnet may be attached to the substrate with a screw and an adhesive.

In the aspect of the inertial sensor unit, as the magnet, three or more magnets may be provided. The inertial sensor may be surrounded by a line connecting the three or more magnets, as viewed in a plan view from a direction in which the substrate and the case overlap each other.

DESCRIPTION OF EXEMPLARY EMBODIMENTS

Preferred embodiments of the present disclosure will now be described in detail with reference to the drawings. The embodiments described below should not unduly limit the content of the present disclosure described in the appended claims. Not all the components described below are necessarily essential components of the present disclosure.

1. First Embodiment

1.1. Inertial Sensor Unit

Figure 1:
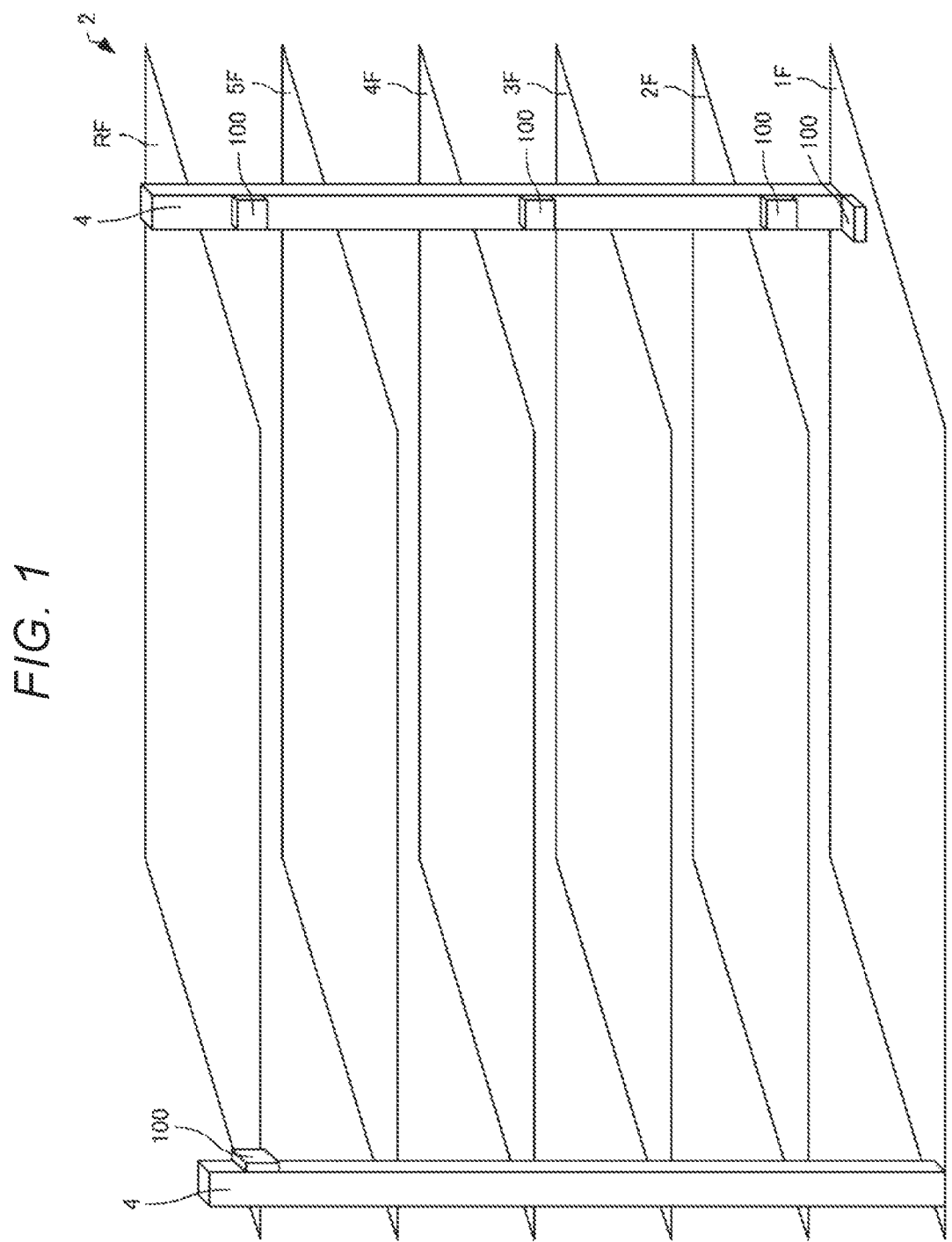
FIG. 1 is a schematic view showing the state where an inertial sensor unit according to a first embodiment is installed at a structure.
Figure 2:
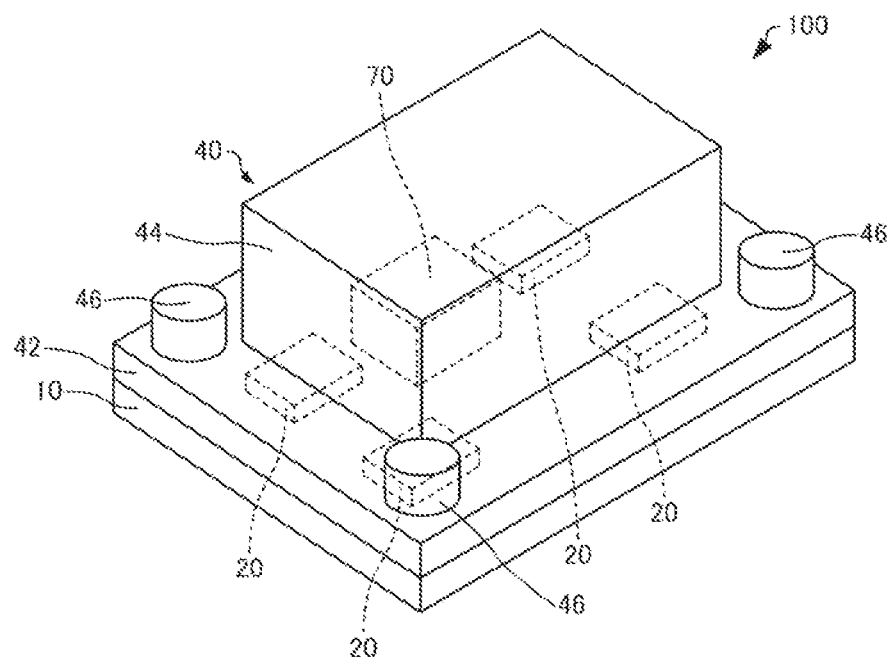
FIG. 2 is a perspective view schematically showing the inertial sensor unit according to the first embodiment.
Figure 3:
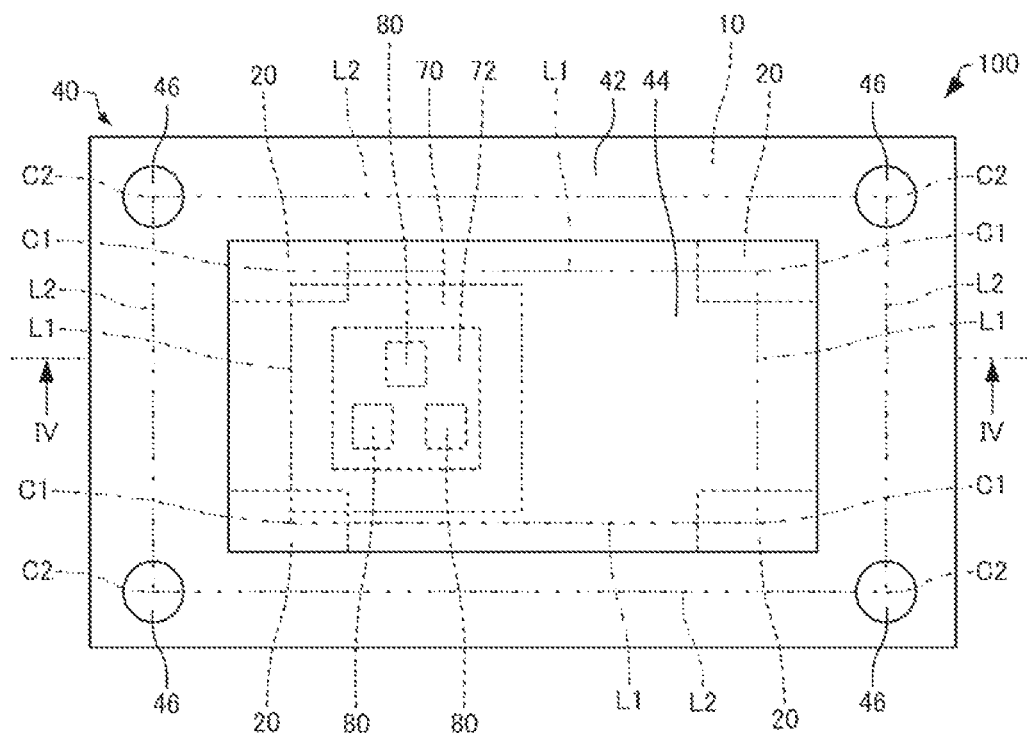
FIG. 3 is a plan view schematically showing the inertial sensor unit according to the first embodiment.
Figure 4:
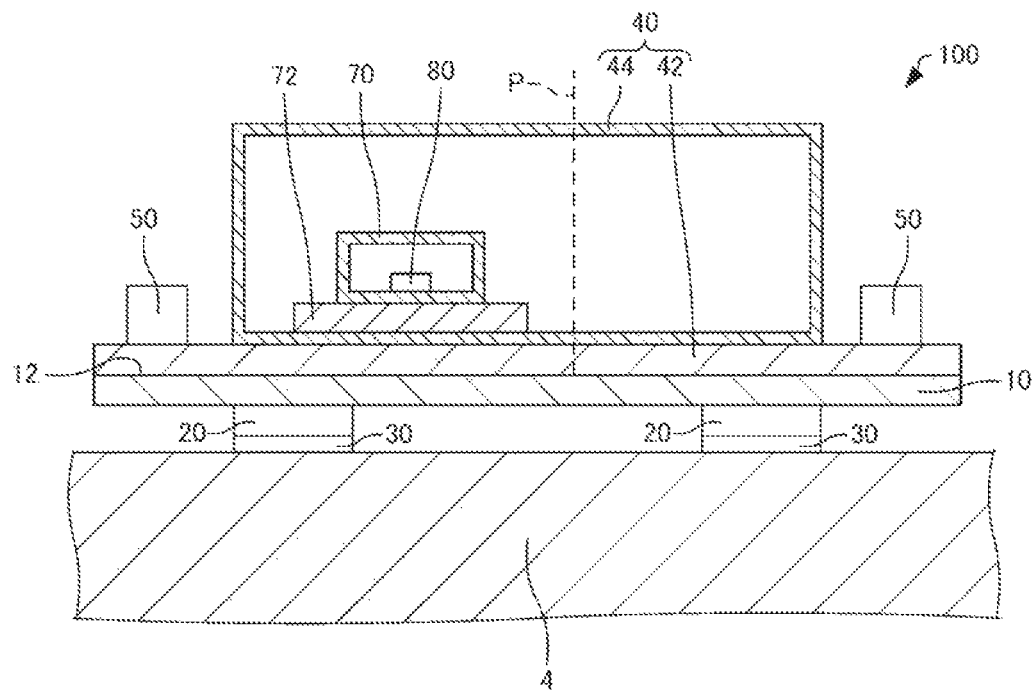
FIG. 4 is a cross-sectional view schematically showing the inertial sensor unit according to the first embodiment.

First, an inertial sensor unit according to a first embodiment will be described with reference to the drawings. FIG. 1 is a schematic view showing the state where an inertial sensor unit 100 according to the first embodiment is installed at a structure. FIG. 2 is a perspective view schematically showing the inertial sensor unit 100 according to the first embodiment. FIG. 3 is a plan view schematically showing the inertial sensor unit 100 according to the first embodiment. FIG. 4 is a cross-sectional view showing the inertial sensor unit 100 according to the first embodiment, taken along IV-IV in FIG. 3. In FIG. 1, the illustration of the inertial sensor unit 100 is simplified for the sake of convenience.

As shown in FIG. 1, the inertial sensor unit 100 is installed, for example, at a building 2. In the illustrated example, the building 2 is a five-story building having floors 1F to 5F, a roof RF, and a steel column 4. A plurality of inertial sensor units 100 are installed. In the illustrated example, four inertial sensor units 100 are installed at the steel column 4, and one inertial sensor unit 100 is installed at the floor 1F.

In the description below, it is assumed that the structure where the inertial sensor unit 100 is installed is the steel column 4, which is a steel member. The inertial sensor unit 100 is used as a vibration meter detecting vibration of the steel column 4, for example, vibration due to an earthquake, or as a clinometer detecting inclination of the steel column 4.

As shown in FIGS. 2 to 4, the inertial sensor unit 100 includes, for example, a first substrate 10, a magnet 20, an adjustment plate 30, an outer case 40, a sensor case 70, and an inertial sensor 80. FIG. 4 shows the state where the inertial sensor unit 100 is installed at the steel column 4.

The first substrate 10 can be installed at the steel column 4. The first substrate 10 has, for example, a rectangular shape having longer sides and shorter sides, as viewed in a plan view from a direction in which the first substrate 10 and the outer case 40 overlap each other (hereinafter also referred to as "in a plan view"). The length of the inertial sensor unit 100 in the direction of the longer side is, for example, 100 mm or longer and 150 mm or shorter. The length of the inertial sensor unit 100 in the direction of the shorter side is, for example, 70 mm or longer and 120 mm or shorter. The length of the inertial sensor unit 100 in the direction orthogonal to the longer side and the shorter side is, for example, 50 mm or longer and 120 mm or shorter. The first substrate 10 is made of, for example, aluminum, copper or the like.

The "direction in which the first substrate 10 and the outer case 40 overlap each other" is the direction of extension of a perpendicular line P to a surface 12 of the first substrate 10 shown in FIG. 4. The surface 12 is a surface of the first substrate 10 and a surface on the side where the outer case 40 is attached.

Figure 5:
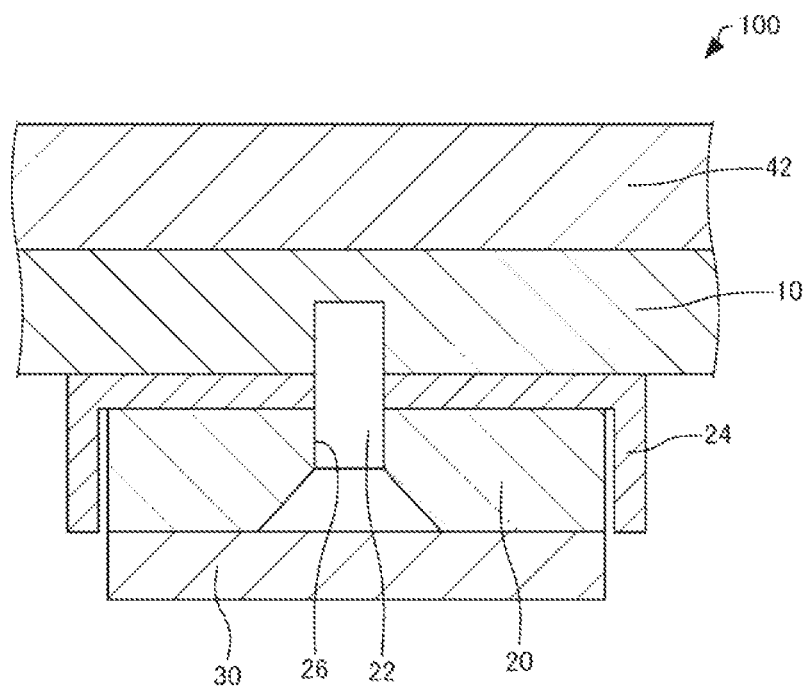
FIG. 5 is a cross-sectional view schematically showing the inertial sensor unit according to the first embodiment.

The magnet 20 is provided at the first substrate 10. FIG. 5 is a cross-sectional view schematically showing the inertial sensor unit 100 and an enlarged view of the vicinities of the magnet 20.

As shown in FIG. 5, the magnet 20 is attached to the first substrate 10 with a screw 22 and an adhesive. In the illustrated example, a cover member 24 covering the magnet 20 is provided between the magnet 20 and the first substrate 10. The screw 22 is a male screw. At least one of the first substrate 10 and the cover member 24 may be provided with a female screw engaged with the screw 22. The magnet 20 is provided with a penetration hole 26 which the screw 22 penetrates. The adhesive may bond the magnet 20 and the cover member 24 together or may bond the cover member 24 and the first substrate 10 together. The adhesive is, for example, an epoxy resin-based adhesive. In FIG. 4, the illustration of the cover member 24 is omitted for the sake of convenience.

The shape of the magnet 20 is, for example, a plate-like shape. Three or more magnets 20 are provided. In the example shown in FIG. 3, four magnets 20 are provided at the first substrate 10. As shown in FIG. 3, the inertial sensor 80 is provided in such a way as to be surrounded by the three or more magnets 20, as viewed in a plan view. The inertial sensor 80 is surrounded by a line connecting the three or more magnets 20, as viewed in a plan view. That is, the inertial sensor 80 is located within a geometric shape surrounded by an imaginary straight line L1 connecting the three or more magnets 20, as viewed in a plan view. In the illustrated example, the imaginary straight line L1 connects the centers C1 of the three or more magnets 20, and the geometric shape surrounded by the imaginary straight line L1 is a rectangle. In the illustrated example, all the inertial sensors 80 are located within the geometric shape surrounded by the imaginary straight line L1.

The magnet 20 is, for example, a neodymium magnet. The magnet 20 is mutually attractive to the steel column 4. The magnet 20 attaches the first substrate 10 to the steel column 4. The material, number, and shape of the magnet 20 are not particularly limited. For example, the shape of the magnet 20 may be circular, as viewed in a plan view.

As shown in FIG. 5, the adjustment plate 30 is provided at the magnet 20. The adjustment plate 30 is provided at the side opposite to the first substrate 10, of the magnet 20. As shown in FIG. 4, the adjustment plate 30 is in contact with the steel column 4. The adjustment plate 30 is attached to the magnet 20, for example, with a screw or adhesive, not illustrated. The adjustment plate 30 is made of a material that is not mutually attractive to the magnet 20 and not mutually repellent to the magnet 20. Thus, the material of the adjustment plate 30 is not influenced by the magnetic force of the magnet 20. Specifically, the adjustment plate 30 is made of wood, aluminum, copper, cloth or the like.

Figure 6:
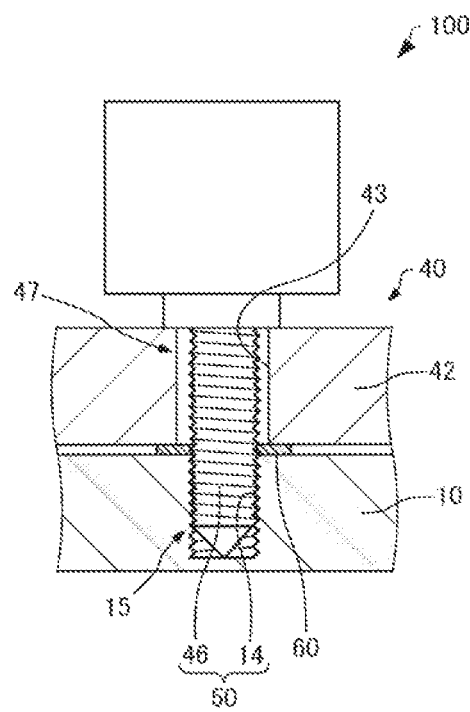
FIG. 6 is a cross-sectional view schematically showing the inertial sensor unit according to the first embodiment.

The outer case 40 is provided at the side opposite to the magnet 20, of the first substrate 10. The outer case 40 has a second substrate 42, a main body case 44, and a male screw 46. The second substrate 42 is made of, for example, aluminum, copper or the like. The main body case 44 is supported by the second substrate 42. The main body case 44 accommodates the inertial sensor 80. The main body case 44 is made of, for example, aluminum, copper, plastic or the like. FIG. 6 is a cross-sectional view schematically showing the inertial sensor unit 100 and an enlarged view of the vicinities of the male screw 46.

As shown in FIG. 6, the second substrate 42 is provided with a penetration hole 43. The first substrate 10 is provided with a female screw 14. The penetration hole 43 and the female screw 14 overlap each other, as viewed in a plan view.

The male screw 46 passes through the penetration hole 43 and is engaged with the female screw 14. That is, the male screw 46 passes through the penetration hole 43 and is screwed into the female screw 14. The penetration hole 43 is a clearance hole having a larger diameter than the diameter of the male screw 46.

The penetration hole 43 and the male screw 46 passing through the penetration hole 43 together form a first attachment part 47. That is, the outer case 40 is provided with the first attachment part 47. The female screw 14 forms a second attachment part 15. That is, the first substrate 10 is provided with the second attachment part 15.

As the first attachment part 47 and the second attachment part 15 become fitted together, the outer case is attached to the first substrate 10. The fitting between the first attachment part 47 and the second attachment part 15 is the engagement between the male screw 46 passing through the penetration hole 43 and the female screw 14. The first attachment part 47 and the second attachment part 15 are fitted together to form a fitting part 50. Specifically, the fitting part 50 is formed by the male screw 46 and the female screw 14.

As shown in FIG. 3, three or more fitting parts 50 are provided. In the illustrated example, four fitting parts 50 are provided. The inertial sensor 80 is provided in such a way as to be surrounded by the three or more fitting parts 50, as viewed in a plan view. The inertial sensor 80 is surrounded by a line connecting the three or more fitting parts 50, as viewed in a plan view. That is, the inertial sensor 80 is located within a geometric shape surrounded by an imaginary straight line L2 connecting the three or more fitting parts 50, as viewed in a plan view. In the illustrated example, the imaginary straight line L2 connects the centers C2 of the three or more male screws 46, and the geometric shape surrounded by the imaginary straight line L2 is a rectangle. In the illustrated example, all the inertial sensors 80 are located within the geometric shape surrounded by the imaginary straight line L2.

Figure 7:
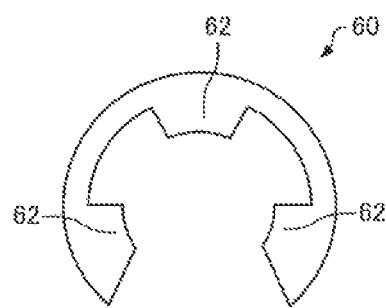
FIG. 7 is a plan view schematically showing a screw retainer in the inertial sensor unit according to the first embodiment.

As shown in FIG. 6, a screw retainer 60 is provided between the first substrate 10 and the second substrate 42. The screw retainer 60 has a size that does not penetrate the penetration hole 43. The male screw 46 passes through the screw retainer 60. FIG. 7 is a plan view schematically showing the screw retainer 60. As shown in FIG. 7, the screw retainer 60 is an E-ring having a contact part 62 coming into contact with the male screw 46. The screw retainer 60 has, for example, three contact parts 62.

Figure 8:
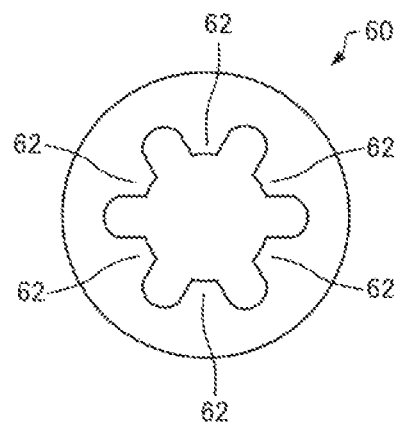
FIG. 8 is a plan view schematically showing the screw retainer in the inertial sensor unit according to the first embodiment.

The shape of the screw retainer 60 is not particularly limited, provided that the screw retainer 60 has the function of retaining the male screw 46. The screw retainer 60 may have, for example, a shape having six contact parts 62 as shown in FIG. 8. In FIGS. 2, 4, and 5, the illustration of the screw retainer 60 is omitted for the sake of convenience.

The sensor case 70 is accommodated in the main body case 44, as shown in FIG. 4. In the illustrated example, the sensor case 70 is provided inside the main body case 44 via a support plate 72. The sensor case 70 is made of, for example, the same material as the main body case 44.

Figure 9:
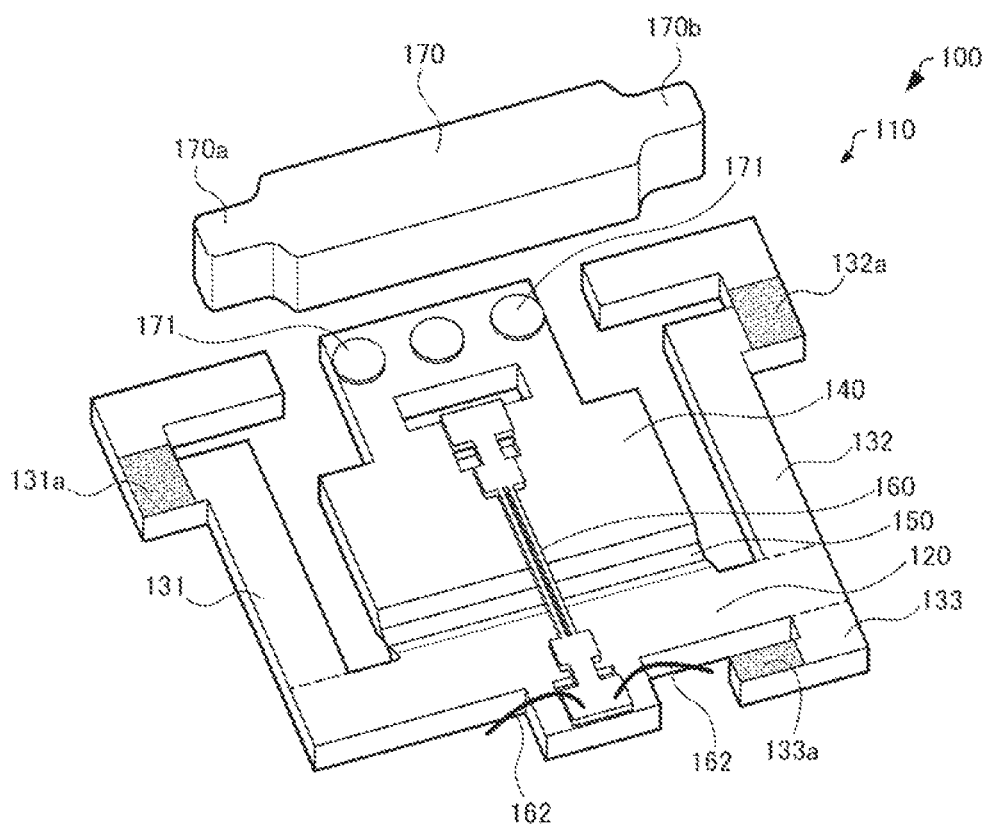
FIG. 9 is a perspective view schematically showing a sensor part of an inertial sensor of the inertial sensor unit according to the first embodiment.
Figure 10:
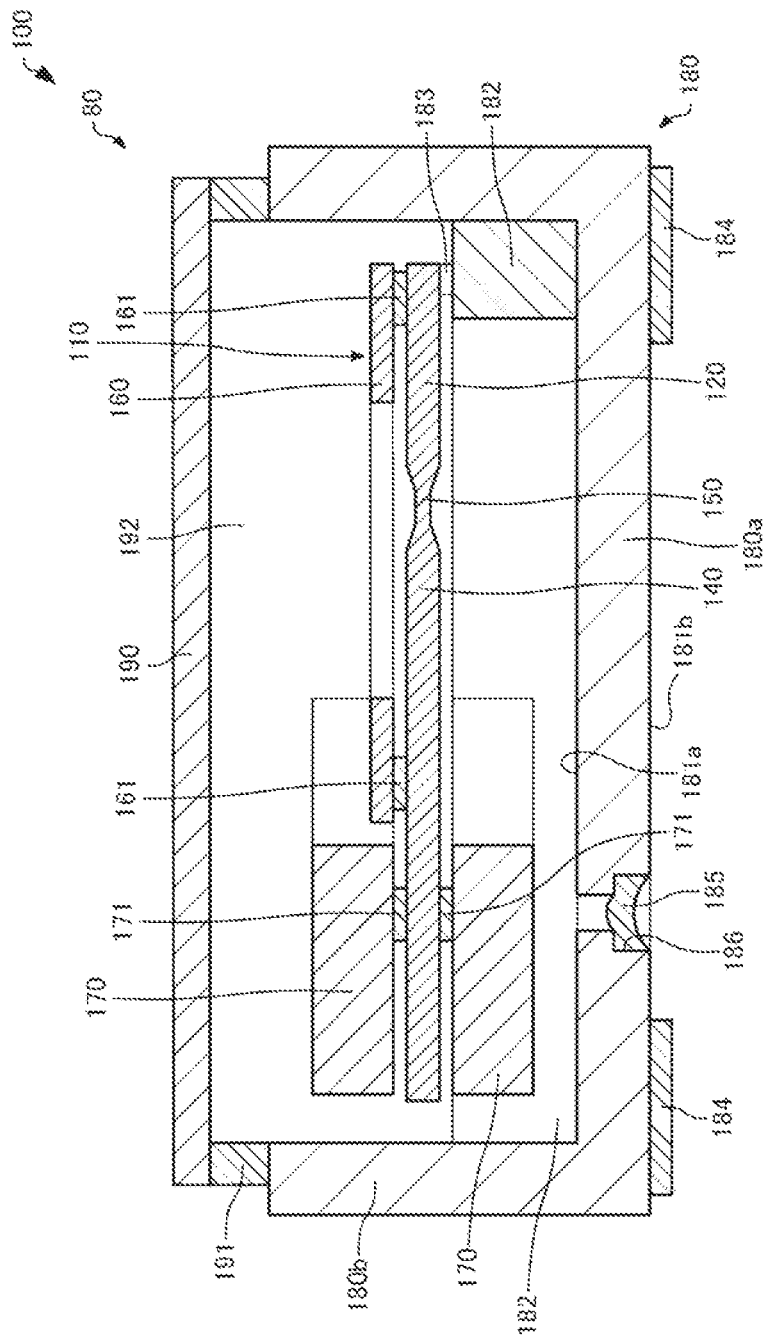
FIG. 10 is a cross-sectional view schematically showing the inertial sensor of the inertial sensor unit according to the first embodiment.
Figure 11:
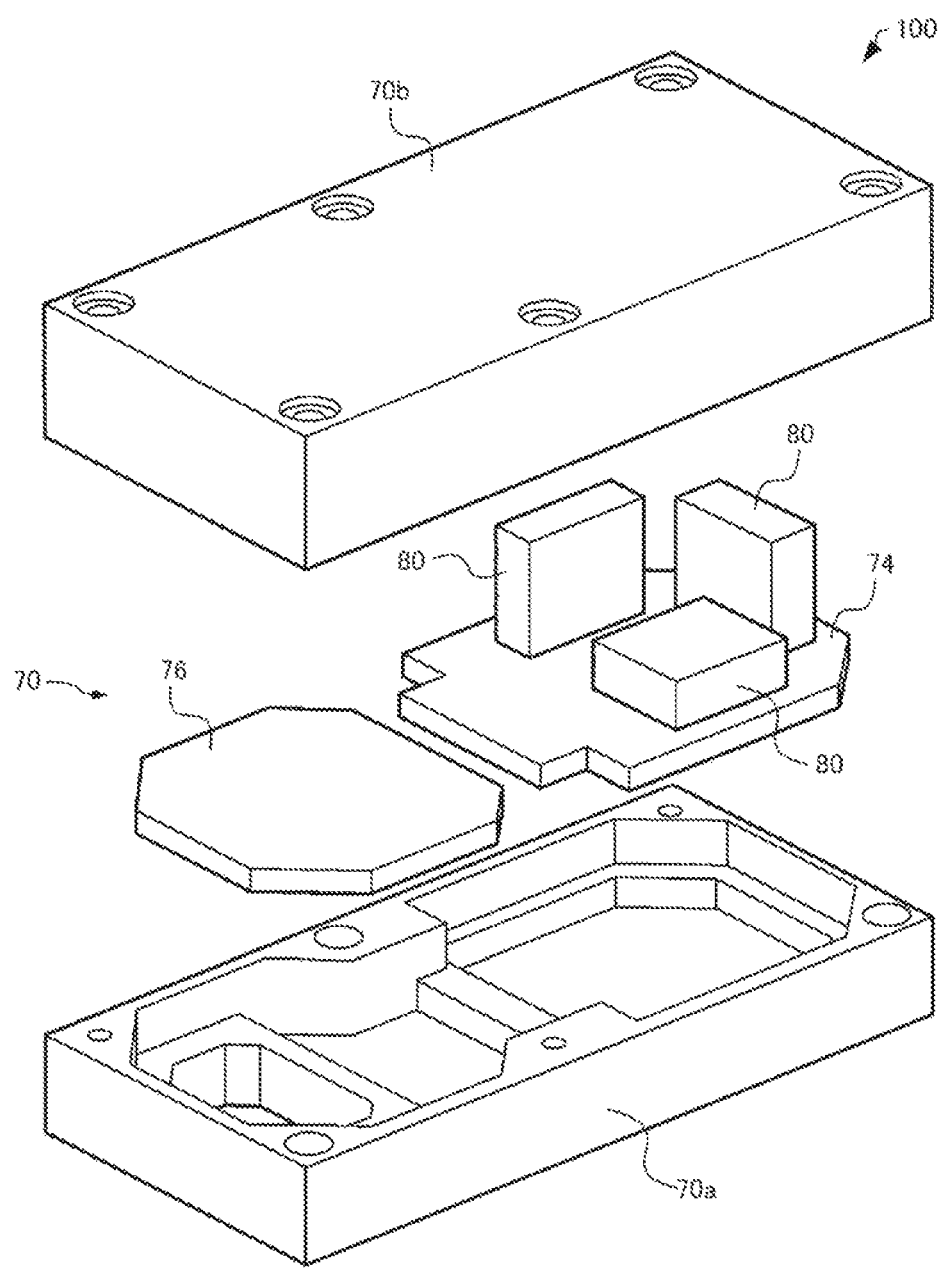
FIG. 11 is an exploded perspective view schematically showing the inertial sensor unit according to the first embodiment.

FIG. 9 is a perspective view schematically showing a sensor part 110 of the inertial sensor 80. FIG. 10 is a cross-sectional view schematically showing the inertial sensor 80. FIG. 11 is an exploded perspective view schematically showing the inertial sensor unit 100.

In FIG. 3, the illustration of the inertial sensor 80 is simplified for the sake of convenience. In FIG. 4, the illustration of the sensor case 70 is simplified. In FIG. 11, the illustration of components other than the sensor case 70, a circuit board 74, a connector board 76, and the inertial sensor 80 is omitted.

As shown in FIGS. 9 and 10, the inertial sensor 80 has the sensor part 110. The sensor part 110 has, for example, a base part 120, a first arm 131, a second arm 132, a third arm 133, a moving part 140, a constricted part 150, a physical quantity detection element 160, and a mass part 170.

The first arm 131, the second arm 132, and the third arm 133 are coupled at their base portions to the base part 120 and are provided with fixed areas 131a, 132a, 133a, respectively, at their free end sides.

The moving part 140 is coupled to the base part 120. The description that "the moving part 140 is coupled to the base part 120" includes the case where the moving part 140 is directly coupled to the base part 120 and the case where the moving part 140 is coupled to the base part 120 via a part such as the constricted part 150. In the illustrated example, the moving part 140 is coupled to the base part 120 via the constricted part 150. The moving part 140 is, for example, a cantilever using the constricted part 150 as the fulcrum.

The constricted part 150 is arranged between the base part 120 and the moving part 140. The constricted part 150 couples the base part 120 and the moving part 140 together. The base part 120, the arms 131, 132, 133, the moving part 140, and the constricted part 150 are provided, for example, as a unified structure. The base part 120, the arms 131, 132, 133, the moving part 140, and the constricted part 150 are made of, for example, quartz crystal.

The physical quantity detection element 160 is formed of, for example, a double tuning fork-type quartz crystal vibrator. The physical quantity detection element 160 detects, for example, an acceleration as a physical quantity. The physical quantity detection element 160 is arranged at the moving part 140. In the illustrated example, the physical quantity detection element 160 is arranged at the base part 120 and the moving part 140 across the constricted part 150, as viewed in a plan view from the direction of the thickness of the base part 120. As shown in FIG. 10, the physical quantity detection element 160 is attached to the base part 120 and the moving part 140 via a bonding part 161 such as an adhesive.

The mass part 170 is arranged at the moving part 140. In the illustrated example, the mass part 170 is arranged at the free end side of the moving part 140, which is a cantilever. The mass part 170 may be arranged only at the surface side of the moving part 140 or may be arranged at the surface side and the back side of the moving part 140 as shown in FIG. 10. The mass part 170 is attached to the moving part 140 via a bonding part 171 such as an adhesive. The mass part 170 can improve the physical quantity detection sensitivity of the inertial sensor 80.

The mass part 170 moves up and down with the moving part 140. Ends 170a, 170b of the mass part 170 come into contact with the first arm 131 and the second arm 132 shown in FIG. 9, respectively, and thus function as a stopper to prevent excessive amplitude.

The mass part 170 is made of a non-magnetic material. Therefore, the mass part 170 is not mutually attractive to the magnet 20. The mass part 170 is not mutually repellent to the magnet 20, either. The mass part 170 is made of, for example, a paramagnetic material or a diamagnetic material. The mass part 170 is made of, for example, phosphor bronze, aluminum, manganese, platinum, copper, gold, silver, zinc, lead, or glass.

The mass part 170 at the surface side of the moving part 140 may be made of a paramagnetic material (aluminum, manganese, platinum), whereas the mass part 170 at the back side of the moving part 140 may be made of a diamagnetic material (phosphor bronze, copper, gold, silver, zinc, lead, glass). Alternatively, the mass part 170 at the surface side of the moving part 140 may be made of a diamagnetic material, whereas the mass part 170 at the back side of the moving part 140 may be made of a paramagnetic material. The mass part 170 may have a multilayer structure formed of a paramagnetic material and a diamagnetic material. This can reduce the influence of the magnetic force of the magnet 20. Specifically, the paramagnetic material is magnetized in a direction parallel to the direction of the magnetic force of the magnet 20 and the diamagnetic material is magnetized in the opposite direction, thus offsetting the magnetic forces of the paramagnetic material and the diamagnetic material.

As the moving part 140 is displaced about the constricted part 150 as the fulcrum according to an acceleration, a stress is generated at the physical quantity detection element 160 attached to the base part 120 and the moving part 140. The vibration frequency, that is, resonance frequency, of the physical quantity detection element 160 changes according to the stress applied to the physical quantity detection element 160. Based on this change in vibration frequency, the inertial sensor 80 can detect the acceleration.

As shown in FIG. 10, the inertial sensor 80 has a base 180 where the sensor part 110 is loaded. The base 180 is formed as a package base including a bottom wall 180a and a sidewall 180b. The base 180, together with a lid 190, forms a package accommodating the sensor part 110. The lid 190 is bonded to an open end of the base 180 via an adhesive 191.

At the bottom wall 180a of the base 180, a step part 182 that is one step higher than an inner surface 181a of the bottom wall 180a is provided, for example, along three of the four sidewalls 180b. The step part 182 may protrude from the inner surface of the sidewall 180b or may be unified with or separate from the base 180. The sensor part 110 is fixed to the step part 182 with an adhesive 183. Preferably, the adhesive 183 is a resin-based adhesive having a high elastic modulus, for example, an epoxy resin adhesive. This is because an adhesive made of low-melting glass or the like is hard and therefore cannot absorb a stress-strain generated at the time of bonding, thus adversely affecting the physical quantity detection element 160. The sensor part 110 is fixed to the step part 182 in the fixed areas 131a, 132a, 133a.

As shown in FIG. 9, the physical quantity detection element 160 is coupled via a bonding wire 162 to an electrode, not illustrated, provided at the step part 182. In this case, the base 180 may not be provided with an electrode.

As shown in FIG. 10, the bottom wall 180a of the base 180 is provided with an external terminal 184 at an outer surface 181b, which is opposite to the inner surface 181a. The external terminal 184 is electrically coupled to the physical quantity detection element 160 via a wiring and an electrode or the like, not illustrated.

The bottom wall 180a is provided, for example, with a sealing part 185 sealing a cavity 192 of the package formed by the base 180 and the lid 190. The sealing part 185 is provided in a penetration hole 186 formed in the base 180. The sealing part 185 is provided by arranging a sealing material in the penetration hole 186, then heating and melting the sealing material, and subsequently solidifying the sealing material. The sealing part 185 is provided to airtightly seal the cavity 192.

The sensor case 70 accommodates three inertial sensors 80, as shown in FIG. 11. The three inertial sensors 80 have detection axes orthogonal to each other and detect accelerations on the three axes orthogonal to each other. That is, the three inertial sensors 80 are an acceleration sensor detecting an acceleration on a first axis, an acceleration sensor detecting an acceleration on a second axis, and an acceleration sensor detecting an acceleration on a third axis. The first axis, the second axis, and the third axis are the axes orthogonal to each other.

The sensor case 70 is formed of, for example, a package base 70a and a lid 70b. The sensor case 70 accommodates the circuit board 74 and the connector board 76. The circuit board 74 is electrically coupled to the external terminal 184 of the inertial sensor 80. The connector board 76 is electrically coupled to the circuit board 74. In FIG. 4, the illustration of the circuit board 74 and the connector board 76 is omitted for the sake of convenience.

The inertial sensor unit 100 has, for example, the following features.

The inertial sensor unit 100 includes the first substrate 10, the magnet 20 for attaching the first substrate 10 to the steel column 4, and the outer case 40 accommodating the inertial sensor 80. The outer case 40 is provided with the first attachment part 47. The first substrate 10 is provided with the second attachment part 15. The first attachment part 47 and the second attachment part are fitted together. Therefore, first attaching the first substrate 10 to the steel column 4 with the magnet 20 and then attaching the outer case 40 to the first substrate via the first attachment part 47 and the second attachment part 15 enables the inertial sensor unit 100 to be installed at the steel column 4. Thus, an unwanted impact applied to the inertial sensor 80 when the inertial sensor unit 100 is installed at the steel column 4 can be reduced, compared with the case where the inertial sensor unit is directly installed at the steel column with the magnet. This can reduce the risk of the inertial sensor 80 being damaged by an unwanted impact applied to the inertial sensor 80 when installed at the steel column 4.

In the inertial sensor unit 100, the inertial sensor 80 has the mass part 170 arranged at the moving part 140. The mass part 170 is made of a non-magnetic material. Therefore, in the inertial sensor unit 100, the mass part 170 and the magnet 20 do not attract each other and the magnet 20 does not obstruct the movement of the moving part 140. Therefore, in the inertial sensor unit 100, the influence of the magnetic force of the magnet 20 on the inertial sensor 80 can be reduced. Thus, the inertial sensor 80 can detect an acceleration more accurately than in the case where the mass part is made of a ferromagnetic material. Also, the mass part 170 is not influenced by the magnetic force of another component that is different from the magnet 20. This another component may be, for example, a motor or the like, not illustrated, provided in the building 2.

Although FIG. 4 shows the state where the inertial sensor unit 100 is installed at the steel column 4, the inertial sensor unit 100 may not be installed at the steel column 4, provided that the inertial sensor unit 100 is configured to be able to be installed at the steel column 4.

Although FIG. 6 shows the state where the male screw 46 is engaged with the female screw 14, the male screw 46 may not be engaged with the female screw 14, provided that the male screw 46 is configured to be able to be engaged with the female screw 14. For example, in the inertial sensor unit 100, the first substrate 10 and the outer case 40 may be separate from each other.

1.2. Method for Installing Inertial Sensor Unit

Figure 12:
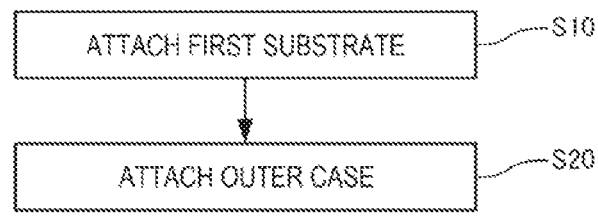
FIG. 12 is a flowchart for explaining a method for installing the inertial sensor unit according to the first embodiment.
Figure 13:
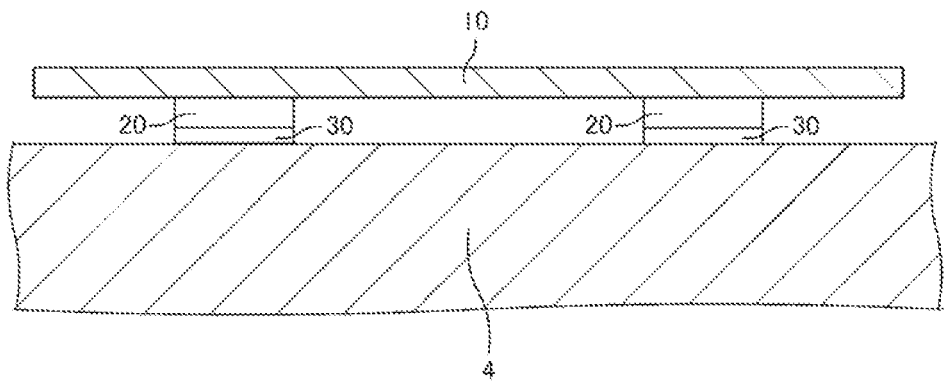
FIG. 13 is a cross-sectional view for explaining the method for installing the inertial sensor unit according to the first embodiment.

A method for installing the inertial sensor unit 100 according to the first embodiment will now be described. FIG. 12 is a flowchart for explaining the method for installing the inertial sensor unit 100 according to the first embodiment. FIG. 13 is a cross-sectional view for explaining the method for installing the inertial sensor unit 100 according to the first embodiment.

As shown in FIG. 13, the first substrate 10 is attached to the steel column 4 with the magnet 20 (step S10). In the illustrated example, the first substrate 10 is attached to the steel column 4 in such a way that the adjustment plate 30 is located between the magnet 20 and the steel column 4.

As shown in FIG. 4, the outer case 40 accommodating the inertial sensor 80 is attached to the first substrate 10 (step S20). Specifically, the first attachment part 47 and the second attachment part 15 are fitted together to attach the outer case 40 to the first substrate 10, as shown in FIG. 6. More specifically, the male screw 46 is inserted into the penetration hole 43 and is engaged with the female screw 14 to attach the outer case 40 to the first substrate 10. In the illustrated example, the male screw 46 is also inserted into the screw retainer 60 located between the outer case 40 and the first substrate 10 and is engaged with the female screw 14 to attach the outer case 40 to the first substrate 10.

The method for installing the inertial sensor unit 100 has, for example, the following features.

The method for installing the inertial sensor unit 100 includes step S10 of attaching the first substrate 10 to the steel column 4 with the magnet 20, and step S20 of attaching the outer case 40 accommodating the inertial sensor 80, to the first substrate 10. The outer case 40 is provided with the first attachment part 47. The first substrate 10 is provided with the second attachment part 15. In step S20, the first attachment part 47 and the second attachment part 15 are fitted together to attach the outer case 40 to the first substrate 10. Thus, an unwanted impact applied to the inertial sensor 80 when the inertial sensor unit 100 is installed at the steel column 4 can be reduced, compared with the case where the inertial sensor unit is directly installed at the steel column with the magnet. This can reduce the risk of the inertial sensor 80 being damaged by an unwanted impact applied to the inertial sensor 80 when installed at the steel column 4.

Also, in the method for installing the inertial sensor unit 100, the influence of the magnetic force of the magnet 20 on the inertial sensor 80 can be reduced, as described above.

Also, in the method for installing the inertial sensor unit 100, since the first substrate 10 is attached to the steel column 4 with the magnet 20, the steel column 4 is not very likely to be damaged when the first substrate 10 is removed from the steel column 4 after the inertial sensor unit 100 is installed at the steel column 4. For example, when the first substrate is attached to the steel column with an adhesive or double-sided adhesive tape or by welding or the like, damage to the steel column, such as the paint of the steel column coming off, may occur when the first substrate is removed.

In the method for installing the inertial sensor unit 100, the first attachment part 47 is formed of the penetration hole 43 provided in the outer case 40 and the male screw 46 passing through the penetration hole 43. The second attachment part 15 is formed of the female screw 14. The fitting between the first attachment part 47 and the second attachment part 15 means the engagement between the male screw 46 passing through the penetration hole 43 and the female screw 14. Therefore, in the method for installing the inertial sensor unit 100, the engagement between the male screw 46 and the female screw 14 enables the outer case 40 to be attached to the first substrate 10.

In the method for installing the inertial sensor unit 100, in step S20, the male screw 46 is inserted into the screw retainer 60 located between the outer case 40 and the first substrate 10. Therefore, the male screw 46 can be prevented from coming off and falling off the outer case 40 by accident when the inertial sensor unit 100 is removed from the steel column 4 after the inertial sensor unit 100 is installed at the steel column 4 and measures, for example, vibration of the steel column 4. The inertial sensor unit 100 is, in some cases, installed at a high location in a building or the like and therefore particularly needs to prevent the male screw 46 from falling off.

In the method for installing the inertial sensor unit 100, as the fitting part 50 where the first attachment part 47 and the second attachment part 15 are fitted together, three or more fitting parts 50 are provided. In step S20, the outer case 40 is attached to the first substrate 10 in such a way that the inertial sensor 80 is surrounded by a line connecting the three or more fitting parts 50, as viewed in a plan view. Therefore, in the method for installing the inertial sensor unit 100, the inertial sensor 80 is arranged more stably than in the case where the inertial sensor is not surrounded by a line connecting the three or more fitting parts, as viewed in a plan view.

In the method for installing the inertial sensor unit 100, the magnet 20 is attached to the first substrate with the screw 22 and the adhesive. Therefore, the magnet 20 is attached to the first substrate 10 more firmly than, for example, in the case where the magnet is attached with only one of the screw and the adhesive.

In the method for installing the inertial sensor unit 100, as the magnet 20, three or more magnets 20 are provided. In step S20, the outer case 40 is attached to the first substrate 10 in such a way that the inertial sensor 80 is surrounded by a line connecting the three or more magnets 20, as viewed in a plan view. Therefore, in the method for installing the inertial sensor unit 100, the inertial sensor 80 is arranged more stably than in the case where the inertial sensor is not surrounded by a line connecting the three or more magnets, as viewed in a plan view.

In the method for installing the inertial sensor unit 100, in step S10, the first substrate 10 is attached in such a way that the adjustment plate 30 is located between the magnet 20 and the steel column 4. The adjustment plate 30 is made of a material that is not mutually attractive to the magnet 20 and not mutually repellent to the magnet 20. This can reduce the risk of the magnet 20 not being detached from the steel column 4, for example, due to a very strong magnetic force of the magnet 20, when the inertial sensor unit 100 is to be removed from the steel column 4. In this way, the adjustment plate 30 can adjust the magnetic force of the magnet 20 acting onto the steel column 4.

The structure where the inertial sensor unit 100 is installed is not limited to the building, provided that the inertial sensor unit 100 can be installed at the structure with the magnet 20. For example, an electricity transmission tower, wind turbine, electronic traffic sign or the like may be employed.

1.3. Modifications of Inertial Sensor Unit

1.3.1. First Modification Example

Figure 14:
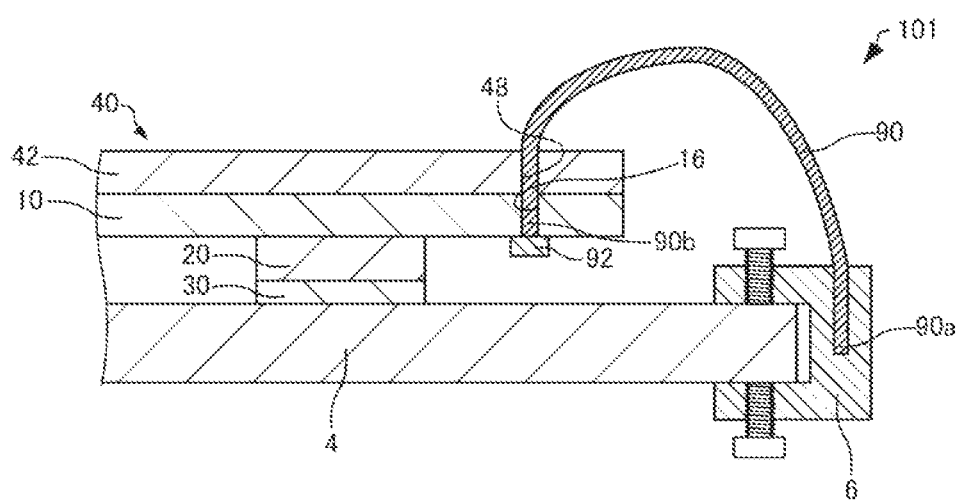
FIG. 14 is a cross-sectional view schematically showing an inertial sensor unit according to a first modification example of the first embodiment.

An inertial sensor according to a first modification example of the first embodiment will now be described with reference to the drawings. FIG. 14 is a cross-sectional view schematically showing an inertial sensor unit 101 according to the first modification example of the first embodiment. In FIG. 14, the illustration of the main body case 44 of the inertial sensor unit 101 is omitted for the sake of convenience.

In the description below, components of the inertial sensor unit 101 according to the first modification example of the first embodiment that have functions similar to the components of the inertial sensor unit 100 according to the first embodiment are denoted by the same reference signs and are not described further in detail. This also applies to inertial sensor units according to second to fourth modification examples of the first embodiment described below.

The inertial sensor unit 101 is different from the inertial sensor unit 100 in having a string 90, as shown in FIG. 14.

The string 90 links the steel column 4 and the second substrate 42 of the outer case 40 together. In the illustrated example, the string 90 links the steel column 4 and the second substrate 42 together via an attachment member 6 attached to the steel column 4. The attachment member 6 may be a C-clamp. The attachment member 6 is configured to fix a first end 90a of the string 90. The string 90 may be rope-like.

The first substrate 10 is provided with a penetration hole 16. The second substrate 42 is provided with a penetration hole 48. In the illustrated example, the string 90 passes through the penetration hole 48, and a second end 90b of the string 90 is located in the penetration hole 16. The second end 90b is provided with a stopper 92. The stopper 92 has a size that does not enter the penetration hole 16.

Figure 15:
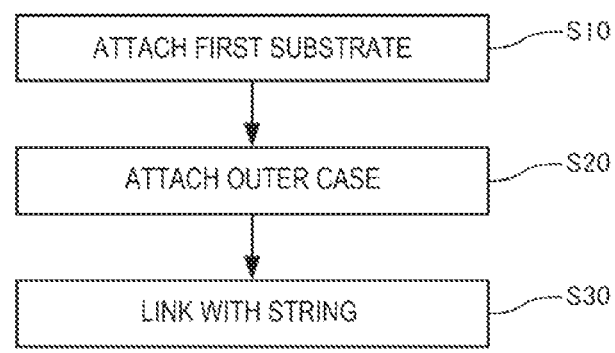
FIG. 15 is a flowchart for explaining a method for installing the inertial sensor unit according to the first modification example of the first embodiment.

FIG. 15 is a flowchart for explaining a method for installing the inertial sensor unit 101. As shown in FIG. 15, after step S20, the steel column 4 and the second substrate 42 of the outer case 40 are linked together via the string 90 (step S30). Specifically, the attachment member 6 with the first end 90a of the string 90 fixed thereto is attached to the steel column 4. Thus, the steel column 4 and the second substrate 42 can be linked together via the string 90.

In the method for installing the inertial sensor unit 101, the steel column 4 and the second substrate 42 are linked together via the string 90. This can prevent the inertial sensor unit 101 from falling off by accident when the inertial sensor unit 101 is removed from the steel column 4.

The step of linking the steel column 4 and the second substrate 42 together via the string 90 may be carried out before step S10 or between step S10 and step S20.

1.3.2. Second Modification Example

Figure 16:
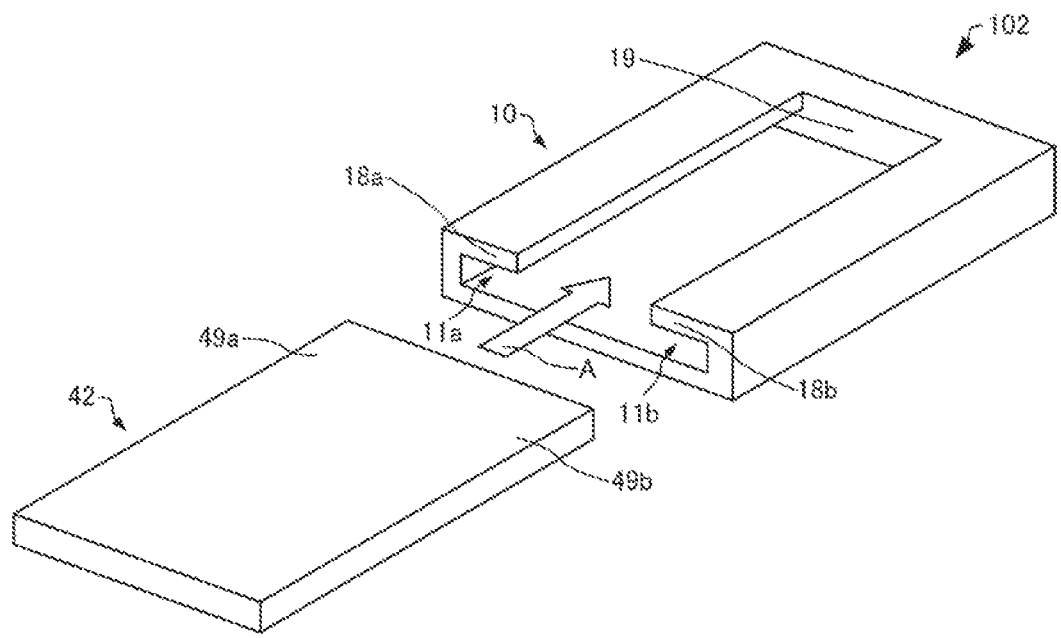
FIG. 16 is a perspective view schematically showing an inertial sensor unit according to a second modification example of the first embodiment.

An inertial sensor unit according to a second modification example of the first embodiment will now be described with reference to the drawings. FIG. 16 is a perspective view schematically showing an inertial sensor unit 102 according to the second modification example of the first embodiment. In FIG. 16, the illustration of components other than the first substrate 10 and the second substrate 42 is omitted for the sake of convenience.

The inertial sensor unit 102 is different from the inertial sensor unit 100 in having third attachment parts 49a, 49b and fourth attachment parts 18a, 18b, as shown in FIG. 16.

The second substrate 42 is provided with the third attachment parts 49a, 49b. The first substrate 10 is provided with the fourth attachment parts 18a, 18b. As shown in FIG. 16, the second substrate 42 is inserted into grooves 11a, 11b provided in the first substrate 10, sliding in the direction of an arrow A. The third attachment part 49a and the fourth attachment part 18a are fitted together. The third attachment part 49b and the fourth attachment part 18b are fitted together. The fourth attachment part 18a is provided along the direction A and prescribes the groove 11a in which the third attachment part 49a is inserted. The fourth attachment part 18b is provided along the direction A and prescribes the groove 11b in which the third attachment part 49b is inserted. The fourth attachment parts 18a, 18b are provided opposite each other.

The first substrate 10 is provided with a stopper 19 stopping the movement of the first substrate 10. The stopper 19 is provided at the side opposite to the side from where the second substrate 42 is inserted. In the illustrated example, the stopper 19 couples the third attachment parts 49a, 49b together.

In a method for installing the inertial sensor unit 102, in step S20 of attaching the outer case 40, the second substrate 42 of the outer case 40 is first moved in the direction of the arrow A in relation to the first substrate 10. Thus, the third attachment part 49a and the fourth attachment part 18a are fitted together, and the third attachment part 49b and the fourth attachment part 18b are fitted together. The second substrate 42 is then moved until coming into contact with the stopper 19. This positions the outer case 40 in relation to the first substrate 10. Next, the second substrate 42 is attached to the first substrate 10 with the male screw 46 and the female screw 14, as shown in FIG. 6.

In the method for installing the inertial sensor unit 102, the outer case 40 is provided with the third attachment parts 49a, 49b, and the first substrate 10 is provided with the fourth attachment parts 18a, 18b. In step S20 of attaching the outer case 40, the third attachment parts 49a, 49b and the fourth attachment parts 18a, 18b are fitted together to position the outer case 40 in relation to the first substrate 10. Therefore, in the method for installing the inertial sensor unit 102, the outer case 40 can be arranged at a more accurate position in relation to the first substrate 10 than in the case where the third attachment parts and the fourth attachment parts are not provided.

1.3.3. Third Modification Example

Figure 17:
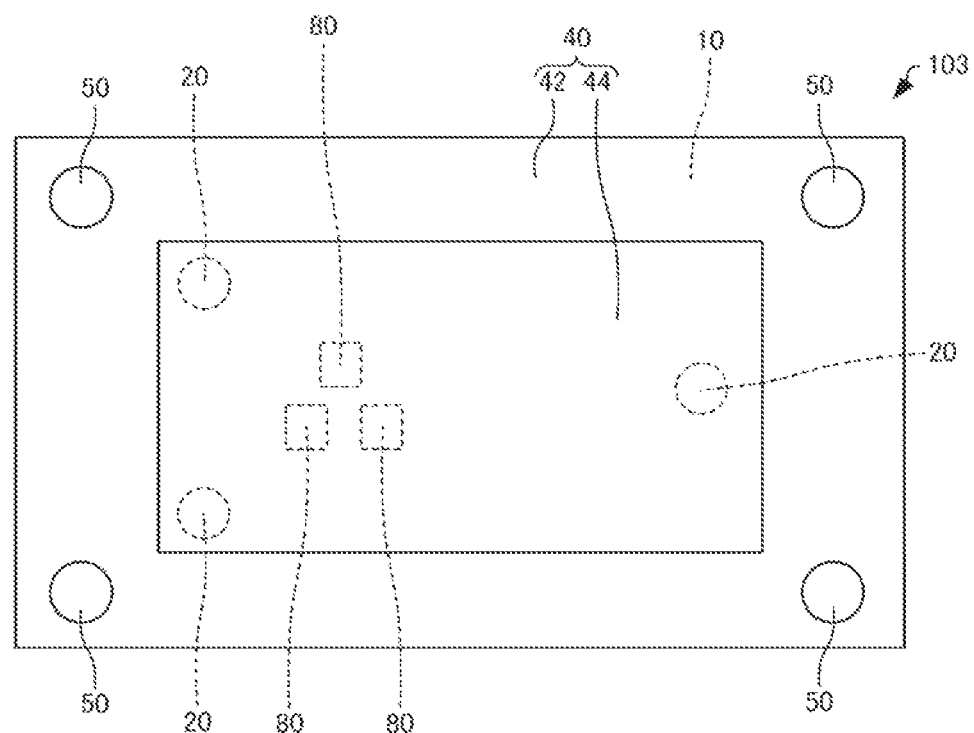
FIG. 17 is a plan view schematically showing an inertial sensor unit according to a third modification example of the first embodiment.

An inertial sensor unit according to a third modification example of the first embodiment will now be described with reference to the drawings. FIG. 17 is a plan view schematically showing an inertial sensor unit 103 according to the third modification example of the first embodiment.

In the inertial sensor unit 100, four magnets 20 are attached, as shown in FIG. 3. In contrast, in the inertial sensor unit 103, three magnets 20 are attached, as shown in FIG. 17. In the illustrated example, the magnet 20 has a circular shape, as viewed in a plan view.

1.3.4. Fourth Modification Example

Figure 18:
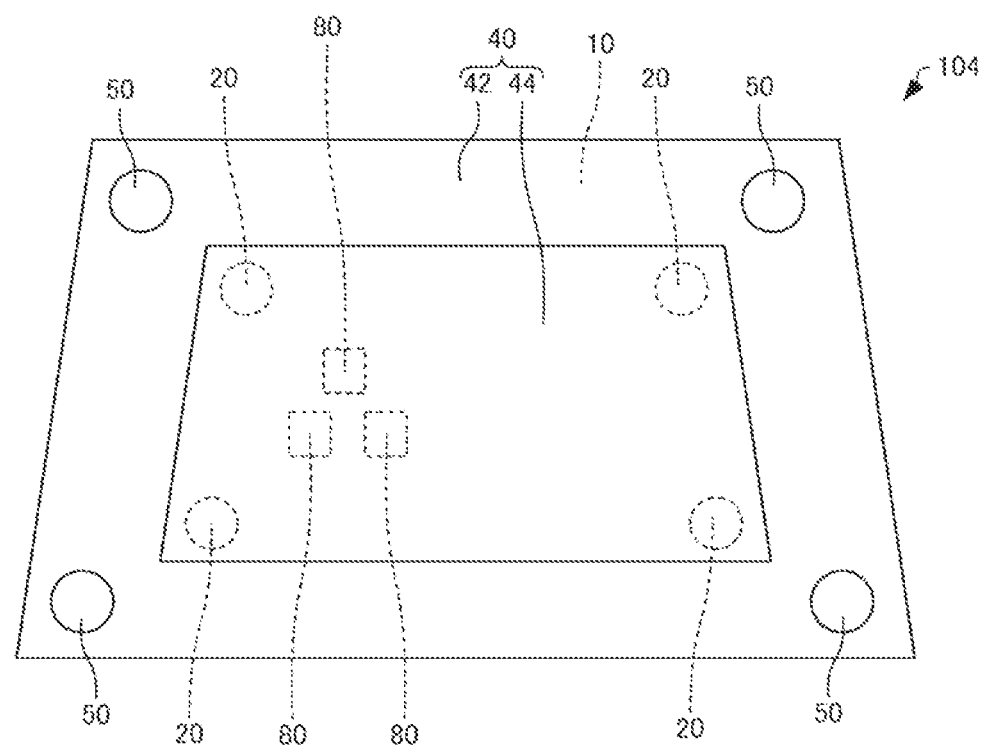
FIG. 18 is a plan view schematically showing an inertial sensor unit according to a fourth modification example of the first embodiment.

An inertial sensor unit according to a fourth modification example of the first embodiment will now be described with reference to the drawings. FIG. 18 is a plan view schematically showing an inertial sensor unit 104 according to the fourth modification example of the first embodiment.

Figure 19:
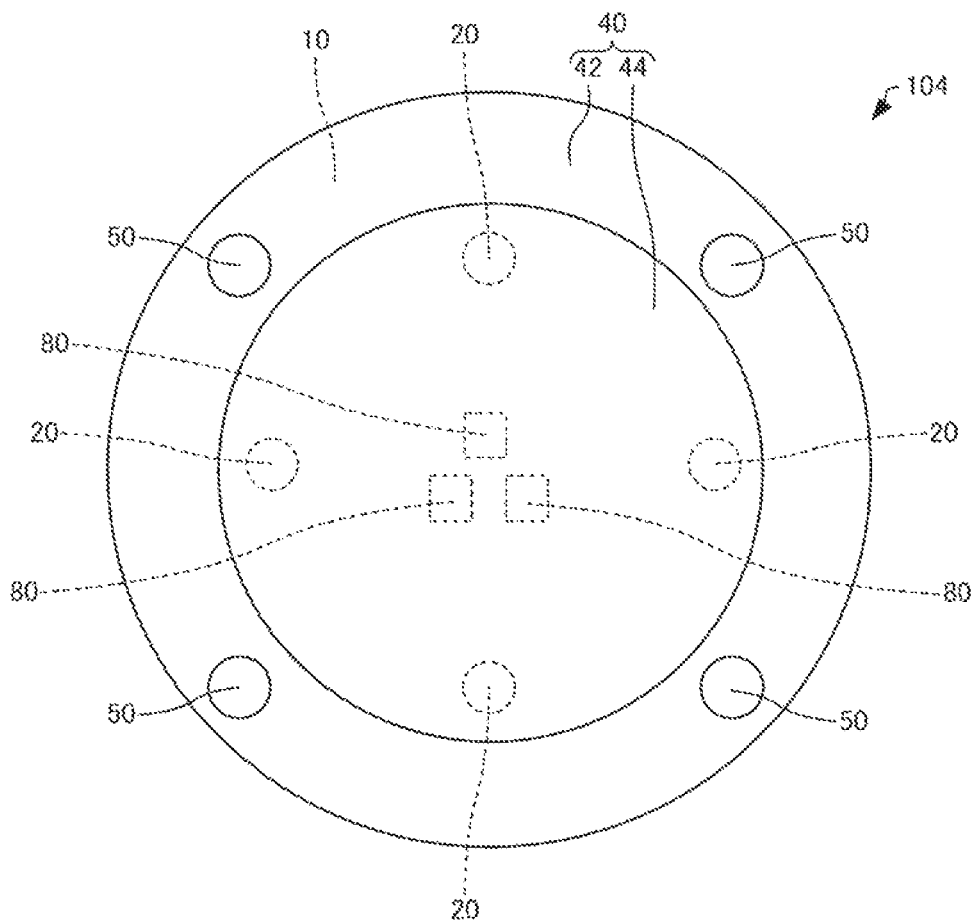
FIG. 19 is a plan view schematically showing the inertial sensor unit according to the fourth modification example of the first embodiment.

In the inertial sensor unit 100, as shown in FIG. 3, the substrates 10, 42 and the main body case 44 have a rectangular shape, as viewed in a plan view. In contrast, in the inertial sensor unit 104, as shown in FIG. 18, the substrates 10, 42 and the main body case 44 have a trapezoidal shape, as viewed in a plan view. However, the shape of the substrates 10, 42 and the main body case 44 is not particularly limited and may be circular as shown in FIG. 19. In the examples shown in FIGS. 18 and 19, the magnet 20 has a circular shape, as viewed in a plan view.

2. Second Embodiment

2.1. Inertial Sensor Unit

Figure 20:
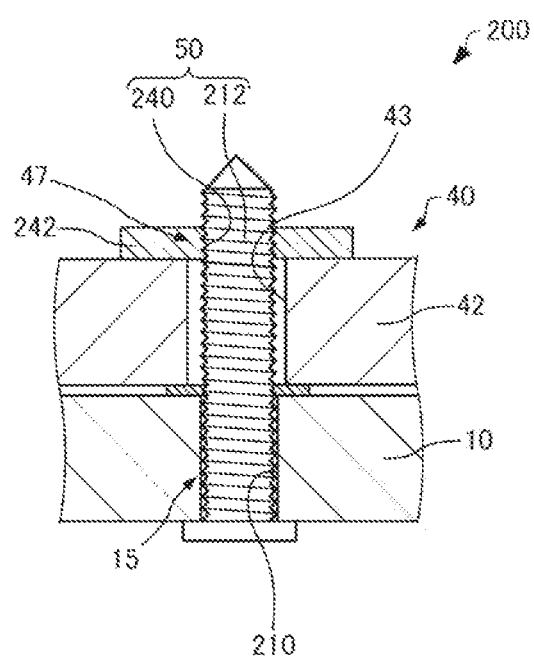
FIG. 20 is a cross-sectional view schematically showing an inertial sensor unit according to a second embodiment.

An inertial sensor unit according to a second embodiment will now be described with reference to the drawings. FIG. 20 is a cross-sectional view schematically showing an inertial sensor unit 200 according to the second embodiment.

In the description below, components of the inertial sensor unit 200 according to the second embodiment that have functions similar to the components of the inertial sensor unit 100 according to the first embodiment are denoted by the same reference signs and are not described further in detail.

In the inertial sensor unit 100, the first attachment part 47 is formed of the penetration hole 43 and the male screw 46, and the second attachment part 15 is formed of the female screw 14, as shown in FIG. 6.

In contrast, in the inertial sensor unit 200, the first attachment part 47 has a female screw 240, and the second attachment part 15 is formed of a penetration hole 210 provided in the first substrate 10 and a male screw 212 passing through the penetration hole 210, as shown in FIG. 20.

The first substrate 10 has the male screw 212. The male screw 212 is inserted into the penetration hole 210 from the side opposite to the second substrate 42. The male screw 212 may be fitted with the penetration hole 210. A female screw engaged with the male screw 212 may be provided at the surface prescribing the penetration hole 210 in the first substrate 10.

The outer case 40 has a nut 242. The nut 242 is provided with the female screw 240. The female screw 240 is engaged with the male screw 212 passing through the penetration hole 43. The first attachment part 47 is formed of the penetration hole 43 and the nut 242. The fitting between the first attachment part 47 and the second attachment part 15 means the engagement between the male screw 212 passing through the penetration hole 43 and the female screw 240. The male screw 212 and the female screw 240 together form the fitting part 50.

2.2. Method for Installing Inertial Sensor Unit

A method for installing the inertial sensor unit 200 according to the second embodiment will now be described with reference to the drawings.

In the step of attaching the outer case 40, the outer case 40 is arranged at the first substrate 10 in such a way that the male screw 212 passes through the penetration hole 43, as shown in FIG. 20. Next, the female screw 240 provided in the nut 242 is engaged with the male screw 212 passing through the penetration hole 43.

The method for installing the inertial sensor unit 200 is basically the same as the method for installing the inertial sensor unit 100 except for the above configuration.

The method for installing the inertial sensor unit 200 has, for example, the following features.

In the method for installing the inertial sensor unit 200, the risk of the inertial sensor 80 being damaged by an unwanted impact applied to the inertial sensor 80 when attached to the steel column 4 can be reduced, as in the method for installing the inertial sensor unit 100. Also, the influence of the magnetic force of the magnet 20 on the inertial sensor 80 can be reduced.

In the method for installing the inertial sensor unit 200, the first attachment part 47 has the female screw 240, and the second attachment part 15 is formed of the penetration hole 210 provided in the first substrate 10 and the male screw 212 passing through the penetration hole 210. The fitting between the first attachment part 47 and the second attachment part 15 means the engagement between the male screw 212 passing through the penetration hole 210 and the female screw 240. Therefore, in the method for installing the inertial sensor unit 200, the engagement between the male screw 212 and the female screw 240 enables the outer case 40 to be attached to the first substrate 10.

In the method for installing the inertial sensor unit 200, the first attachment part 47 is formed of the penetration hole 43 provided in the outer case 40, and the nut 242 provided with the female screw 240 engaged with the male screw 212 passing through the penetration hole 43. Therefore, in the method for installing the inertial sensor unit 200, the nut 242 enables the outer case 40 to be attached to the first substrate 10.

3. Third Embodiment

3.1. Inertial Sensor Unit

Figure 21:
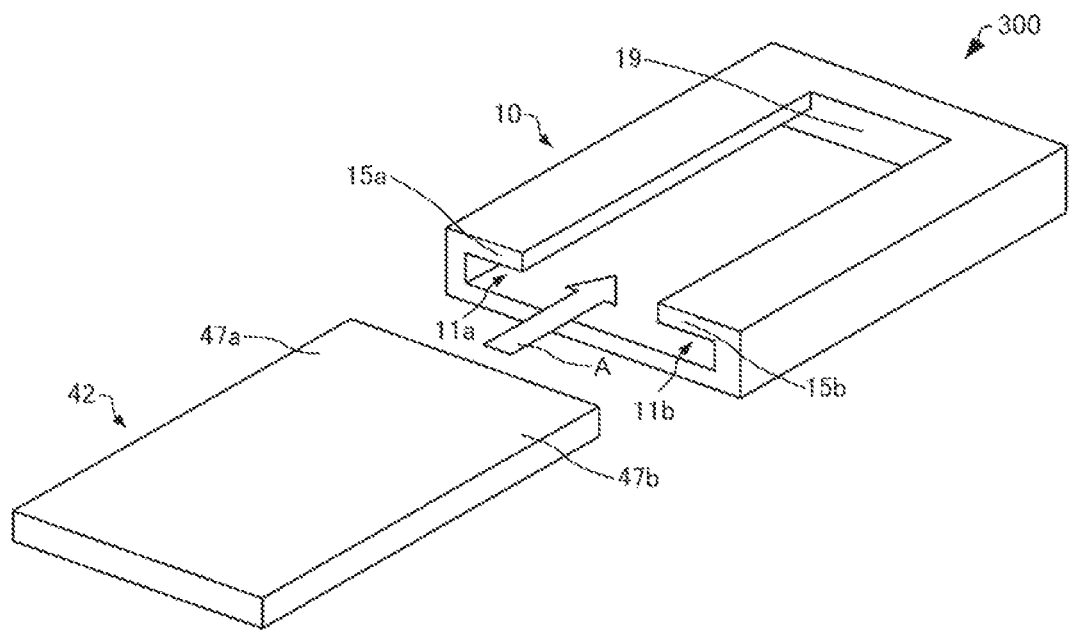
FIG. 21 is a perspective view schematically showing an inertial sensor unit according to a third embodiment.

An inertial sensor unit according to a third embodiment will now be described with reference to the drawings. FIG. 21 is a perspective view schematically showing an inertial sensor unit 300 according to the third embodiment. In FIG. 21, the illustration of components other than the first substrate 10 and the second substrate 42 is omitted for the sake of convenience.

In the description below, components of the inertial sensor unit 300 according to the third embodiment that have functions similar to the components of the inertial sensor unit 100 according to the first embodiment are denoted by the same reference signs and are not described further in detail.

In the inertial sensor unit 100, the first attachment part 47 is formed of the penetration hole 43 and the male screw 46, and the second attachment part 15 is formed of the female screw 14, as shown in FIG. 6.

In contrast, in the inertial sensor unit 300, the second substrate 42 is inserted into the grooves 11a, 11b provided in the first substrate 10, sliding in the direction of the arrow A, as shown in FIG. 21. A first attachment part 47a and a second attachment part 15a are fitted together. A first attachment part 47b and a second attachment part 15b are fitted together. The second attachment part 15a is provided along the direction A and prescribes the groove 11a in which the first attachment part 47a is inserted. The second attachment part 15b is provided along the direction A and prescribes the groove 11b in which the first attachment part 47b is inserted. The second attachment parts 15a, 15b are provided opposite each other.

The first substrate 10 is provided with the stopper 19 stopping the movement of the first substrate 10. The stopper 19 is provided at the side opposite to the side from where the second substrate 42 is inserted. In the illustrated example, the stopper 19 couples the first attachment parts 47a, 47b together.

3.2. Method for Installing Inertial Sensor Unit

A method for installing the inertial sensor unit 300 according to the third embodiment will now be described with reference to the drawings.

In the method for installing inertial sensor unit 300, in the step of attaching the outer case 40, the first attachment parts 47a, 47b and the second attachment parts 15a, 15b are fitted together to attach the outer case 40 to the first substrate 10. Specifically, the second substrate 42 of the outer case 40 is first moved in the direction of the arrow A in relation to the first substrate 10. Thus, the first attachment part 47a and the second attachment part 15a are fitted together, and the first attachment part 47b and the second attachment part 15b are fitted together. The second substrate 42 is then moved until coming into contact with the stopper 19. Thus, the outer case 40 is attached to the first substrate 10.

The method for installing the inertial sensor unit 300 is basically the same as the method for installing the inertial sensor unit 100 except for the above configuration.

The method for installing the inertial sensor unit 300 has, for example, the following features.

In the method for installing the inertial sensor unit 300, the risk of the inertial sensor 80 being damaged by an unwanted impact applied to the inertial sensor 80 when attached to the steel column 4 can be reduced, as in the method for installing the inertial sensor unit 100. Also, the influence of the magnetic force of the magnet 20 on the inertial sensor 80 can be reduced.

In the method for installing the inertial sensor unit 300, the outer case 40 can be attached to the first substrate 10 without using a male screw or a female screw.

4. Fourth Embodiment

4.1. Inertial Sensor Unit

Figure 22:
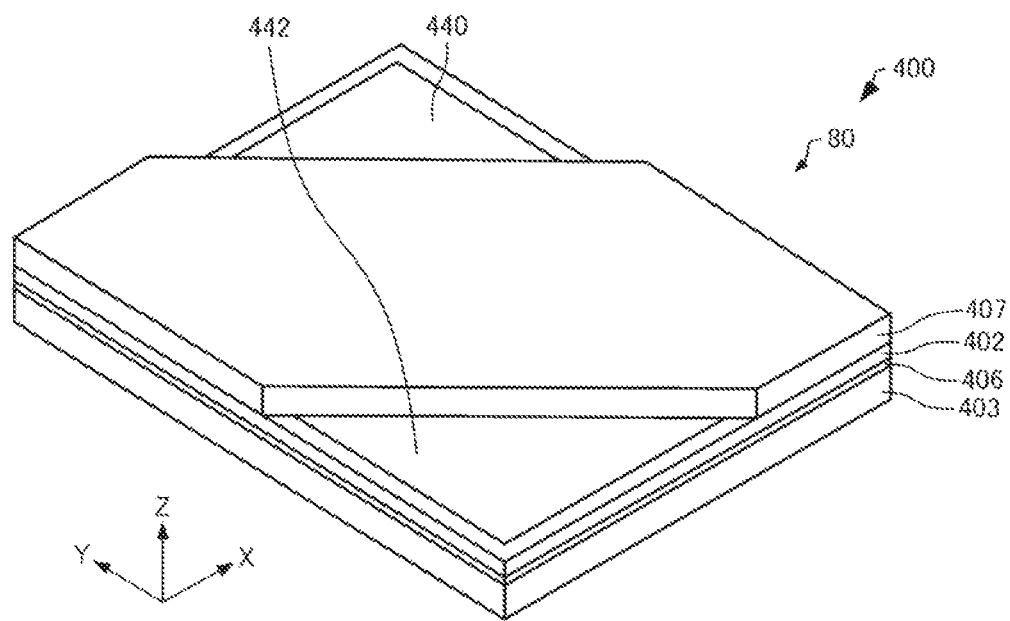
FIG. 22 is a perspective view schematically showing an inertial sensor unit according to a fourth embodiment.
Figure 23:
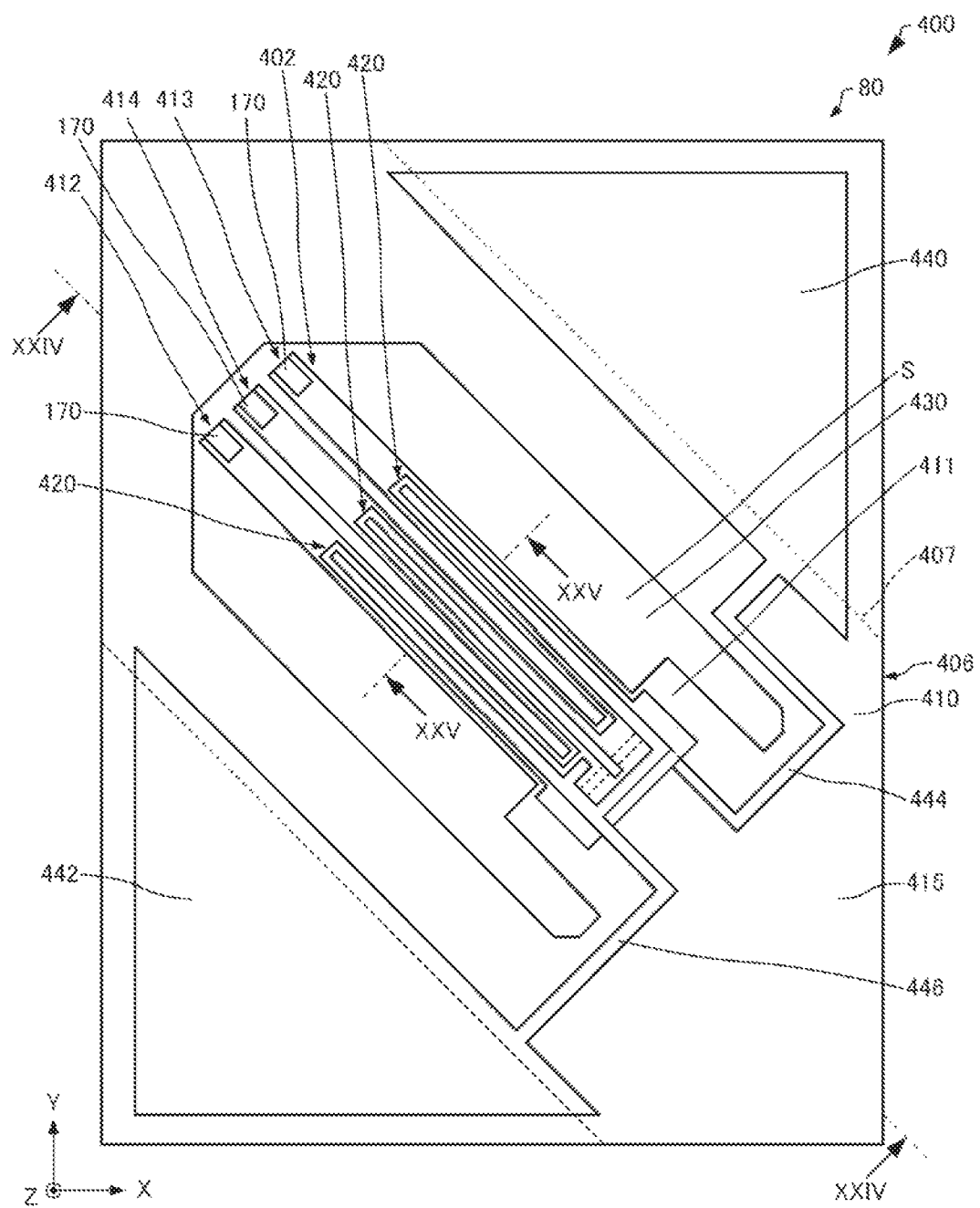
FIG. 23 is a plan view schematically showing the inertial sensor unit according to the fourth embodiment.
Figure 24:
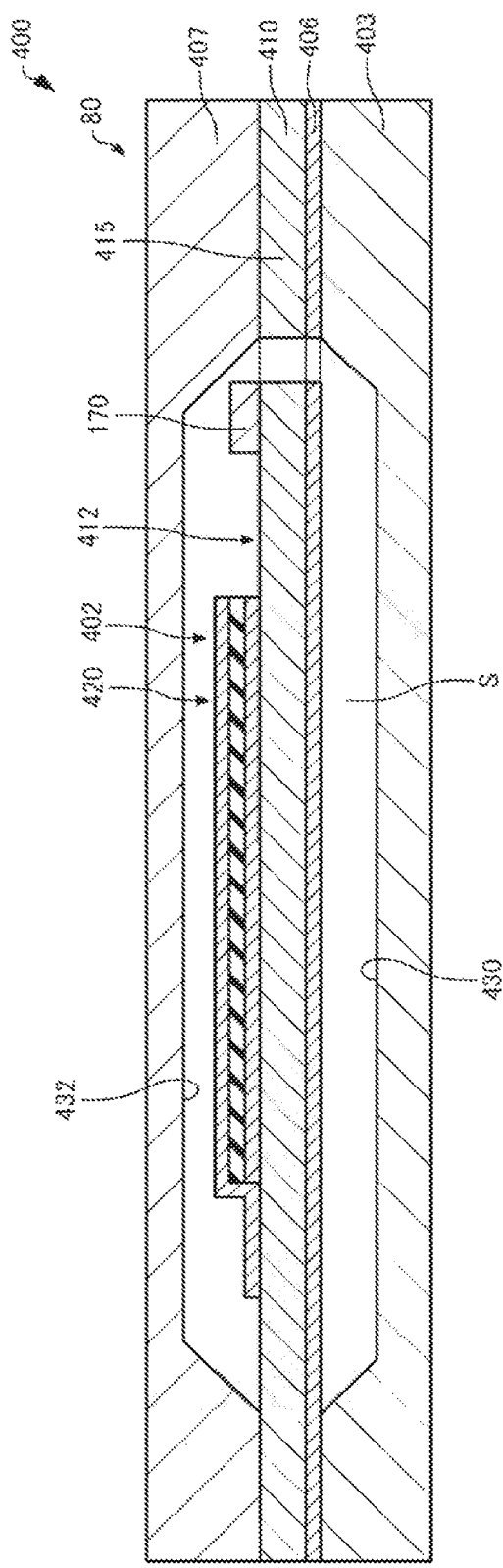
FIG. 24 is a cross-sectional view schematically showing the inertial sensor unit according to the fourth embodiment.
Figure 25:
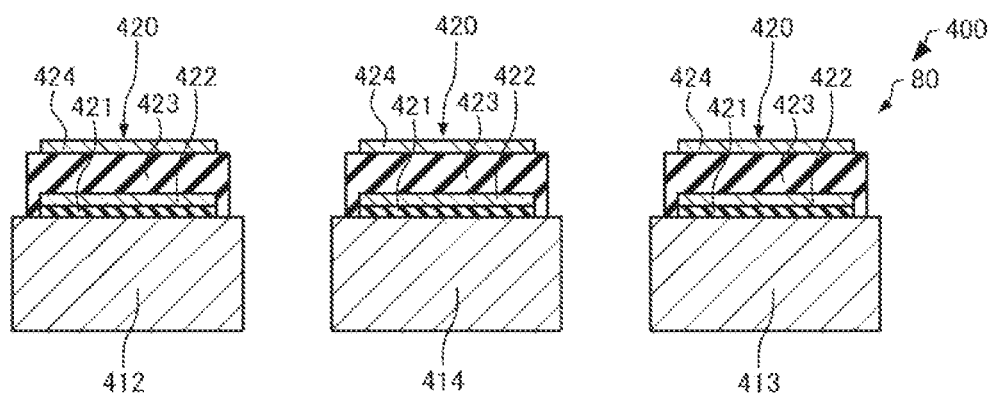
FIG. 25 is a cross-sectional view schematically showing the inertial sensor unit according to the fourth embodiment.

An inertial sensor unit according to a fourth embodiment will now be described with reference to the drawings. FIG. 22 is a perspective view schematically showing the inertial sensor 80 of an inertial sensor unit 400 according to the fourth embodiment. FIG. 23 is a plan view schematically showing the inertial sensor 80 of the inertial sensor unit 400 according to the fourth embodiment. FIG. 24 is a cross-sectional view schematically showing the inertial sensor 80 of the inertial sensor unit 400 according to the fourth embodiment, taken along XXIV-XXIV in FIG. 23. FIG. 25 is a cross-sectional view schematically showing the inertial sensor 80 of the inertial sensor unit 400 according to the fourth embodiment, taken along XXV-XXV in FIG. 23.

In FIGS. 22 and 23, an X-axis, a Y-axis, and a Z-axis are shown as three axes orthogonal to each other. In FIGS. 24 and 25, the illustration of a part of the sites included in the inertial sensor 80 is omitted.

In the description below, components of the inertial sensor unit 400 according to the fourth embodiment that have functions similar to the components of the inertial sensor unit 100 according to the first embodiment are denoted by the same reference signs and are not described further in detail.

In the inertial sensor unit 100, the inertial sensor 80 is an acceleration sensor detecting an acceleration.

In contrast, in the inertial sensor unit 400, the inertial sensor 80 is a gyro sensor detecting an angular velocity.

In the inertial sensor unit 400, the inertial sensor 80 has, for example, a vibrator element 402, a base part 403, an intermediate layer 406, a lid 407, a piezoelectric element 420, and the mass part 170, as shown in FIGS. 22 to 25. FIG. 23 shows the illustration as seen through the lid 407 for the sake of convenience. In FIG. 24, the illustration of the piezoelectric element 420 is simplified.

The vibrator element 402 has a vibrator substrate 410, as shown in FIGS. 23 and 24. The vibrator substrate 410 has a substantially plate-like shape whose thickness is along the Z-axis. The vibrator substrate 410 is made of, for example, quartz crystal, lithium tantalate, lithium niobate, lithium borate, barium titanate, silicon, ceramic, glass or the like.

The vibrator substrate 410 has, for example, a base part 411, three vibrating arms 412, 413, 414, and a frame 415. The vibrating arms 412, 413, 414 are coupled to the base part 411. The vibrating arms 412, 413, 414 extend in the same direction from the base part 411. The vibrating arms 412, 413, 414 are arranged next to each other in a direction orthogonal to the direction of extension. The vibrating arm 414 is located between the vibrating arms 412, 413. An end on the base part 411 side, of the vibrating arms 412, 413, 414, is a fixed end, and an end on the side opposite to the base part 411 is a free end.

An end on the side opposite to the vibrating arms 412, 413, 414, of the base part 411, is coupled to the frame 415. The frame 415 has a frame-like shape as viewed in a plan view. The base part 411 and the vibrating arms 412, 413, 414 are arranged inside the frame 415. The base part 411, the vibrating arms 412, 413, 414, and the frame 415 are provided as a unified structure.

The mass part 170 is arranged at the vibrating arms 412, 413, 414. In the illustrated example, the mass part 170 is arranged on the free end side in the vibrating arms 412, 413, 414. The mass part 170 enables miniaturization of the vibrator element 402 and adjustment of the resonance frequency of the vibrating arms 412, 413, 414.

The piezoelectric element 420 is arranged at the vibrating arms 412, 413, 414, as shown in FIGS. 23 to 25. In the illustrated example, the piezoelectric element 420 is provided on top of the vibrating arms 412, 413, 414. The piezoelectric element 420 can cause the vibrating arms 412, 413, 414 to perform flexural vibration in the z-axis direction. The piezoelectric element 420 has, for example, an insulating layer 421, a first electrode layer 422, a piezoelectric layer 423, and a second electrode layer 424, as shown in FIG. 25.

The insulating layer 421 is provided on top of the vibrating arms 412, 413, 414. The insulating layer 421 electrically insulates the first electrode layer 422 and the vibrator substrate 410 from each other. The insulating layer 421 is made of, for example, silicon oxide, silicon nitride, aluminum nitride or the like.

The first electrode layer 422 is provided on top of the insulating layer 421. The first electrode layer 422 is made of, for example, gold, platinum, aluminum, silver, chromium, copper, molybdenum, niobium, tungsten, iron, titanium, cobalt, zinc, zirconium, zinc oxide, ITO (indium-tin oxide) or the like.

The piezoelectric layer 423 is provided on top of the first electrode layer 422. The piezoelectric layer 423 is made of, for example, zinc oxide, aluminum nitride, lithium tantalate, lithium niobate, potassium niobate, lithium tetraborate, barium titanate, lead zirconate titanate or the like.

The second electrode layer 424 is provided on top of the piezoelectric layer 423. The second electrode layer 424 is made of a material suitably selected from the materials forming the first electrode layer 422 listed above.

The base part 403 has a substantially plate-like shape whose thickness is along the Z-axis, as shown in FIGS. 22 to 24. The base part 403 is provided with a recess 430 opening in a positive direction along the Z-axis. The vibrating arms 412, 413, 414 can be displaced downward via the recess 430. The base part 403 is made of, for example, silicon, ceramic, glass or the like.

The intermediate layer 406 is provided on top of the base part 403. The intermediate layer 406 is provided between the vibrator element 402 and the base part 403. The intermediate layer 406 bonds the frame 415 of the vibrator element 402 and the base part 403 together.

The lid 407 is provided on top of the vibrator substrate 410. The lid 407 is bonded to the frame 415 of the vibrator substrate 410. The lid 407 has a substantially plate-like shape whose thickness is along the Z-axis. The lid 407 has a recess 432 opening in a negative direction along the Z-axis. The vibrating arms 412, 413, 414 can be displaced upward via the recess 432. The lid 407 is made of, for example, silicon, ceramic, glass, metal or the like.

As the lid 407, the vibrator substrate 410, and the base part 403 are bonded together, a space S prescribed by the recesses 430, 432 and the frame 415 is isolated from outside. Bonding the intermediate layer 406 and the vibrator substrate 410 together and bonding the vibrator substrate 410 and the base part 403 together under a reduced pressure or in an inert gas atmosphere can maintain the space S in a reduced-pressure state or inert gas-enclosed state. For the bonding of the intermediate layer 406 and the vibrator substrate 410 and the bonding of the vibrator substrate 410 and the base part 403, for example, direct bonding, anodic bonding, metal bonding using a braze, solder or the like, welding, caulking or the like can be employed.

The lid 407 has, for example, a hexagonal shape as viewed in a plan view from a direction along the Z-axis, as shown in FIG. 23. A part of the vibrator substrate 410 extends further out of the lid 407, as viewed in a plan view from the direction along the Z-axis. Terminal parts 440, 442 are provided at this extended part.

A coupling wire 444 is coupled to the terminal part 440. The coupling wire 444 couples the terminal part 440 and the piezoelectric element 420 together. A coupling wire 446 is coupled to the terminal part 442. The coupling wire 446 couples the terminal part 442 and the piezoelectric element 420 together. The terminal parts 440, 442 and the coupling wires 444, 446 may be formed of a material suitably selected from the materials forming the first electrode layer 422 listed above.

When a voltage is applied between the terminal parts 440 and 442, the piezoelectric element 420 causes the vibrating arms 412, 413, 414 to perform flexural vibration along the Z-axis at a predetermined frequency, that is, resonance frequency. The vibrating arms 412, 413 perform flexural vibration in the same direction. The vibrating arm 414 performs flexural vibration in the direction opposite to the vibrating arms 412, 413.

As the neighboring vibrating arms 412, 414 perform flexural vibration in the opposite directions in this way, leakage vibration generated by the neighboring vibrating arms 412, 414 can be offset. Also, leakage vibration generated by the neighboring vibrating arms 413, 414 can be offset. Thus, the vibrator element 402 can output a signal with a high frequency accuracy.

As the vibrating arms 412, 413, 414 perform flexural vibration, a voltage is generated at a predetermined frequency between the terminal parts 440, 442 due to the piezoelectric effect of the piezoelectric layer 423.

When an angular velocity about an axis parallel to the direction of extension of the vibrating arms 412, 413, 414 is applied in the state where the vibrating arms 412, 413, 414 are performing flexural vibration, a Coriolis force is generated in a direction perpendicular to the direction of vibration of the vibrating arms 412, 413, 414. An electric charge generated in the piezoelectric layer 423 of the piezoelectric element 420 due to this Coriolis force is outputted as a signal from the terminal parts 440, 442. Thus, the applied angular velocity can be detected. The piezoelectric element 420 is a physical quantity detection element for detecting an angular velocity.

The sensor case 70 accommodates three inertial sensors 80. The three inertial sensors 80 have detection axes orthogonal to each other and detect accelerations on the three axes orthogonal to each other.

Although not illustrated, the sensor case 70 may accommodate three inertial sensors 80 detecting accelerations along three axes orthogonal to each other, and three inertial sensors 80 detecting angular velocities along three axes orthogonal to each other.

In the above description, an example using the piezoelectric element 420 as the physical quantity detection element for detecting an angular velocity is described. However, the physical quantity detection element may be other than the piezoelectric element, provided that it can detect an angular velocity.

4.2. Method for Installing Inertial Sensor Unit

A method for installing the inertial sensor unit 400 according to the fourth embodiment will now be described.

The method for installing the inertial sensor unit 400 according to the fourth embodiment is basically the same as the method for installing the inertial sensor unit 100 according to the first embodiment and therefore will not be described further in detail.

In the method for installing the inertial sensor unit 400, the risk of the inertial sensor 80 being damaged by an unwanted impact applied to the inertial sensor 80 when attached to the steel column 4 can be reduced, as in the method for installing the inertial sensor unit 100. Also, since the mass part 170 and the magnet 20 do not attract each other, the magnet 20 does not obstruct the movement of the vibrating arms 412, 413, 414. Therefore, the influence of the magnetic force of the magnet 20 on the inertial sensor 80 can be reduced.

A part of the configurations of the present disclosure may be omitted and the embodiments and modification examples may be combined together within a range that can achieve the features and effects described here.

The present disclosure is not limited to the foregoing embodiments and can be carried out with various modifications. For example, the present disclosure includes a configuration substantially the same as any of the configurations described in the embodiments. The configuration that is substantially the same configuration is, for example, a configuration having the same function, method, and effect, or a configuration having the same object and effect. The present disclosure also includes a configuration resulting from replacing a non-essential part of any of the configurations described in the embodiments. The present disclosure also includes a configuration achieving the same advantageous effect or the same object as any of the configurations described in the embodiments. The present disclosure also includes a configuration resulting from adding a known technique to any of the configurations described in the embodiments.

What is claimed is:

1. A method for installing an inertial sensor unit, the method comprising:
attaching a substrate to a structure with a magnet, the magnet being attached to the substrate with a screw and an adhesive; and
attaching a case accommodating an inertial sensor, to the substrate, wherein
the case is provided with a first attachment part,
the substrate is provided with a second attachment part,
in the attaching the case, the first attachment part and the second attachment part are fitted together to attach the case to the substrate,
the inertial sensor includes
a base part,
a moving part coupled to the base part,
a physical quantity detection element arranged at the moving part, and
a mass part arranged at the moving part, and
the mass part is made of a non-magnetic material.

2. A method for installing an inertial sensor unit, the method comprising:
attaching a substrate to a structure with a magnet, the magnet being attached to the substrate with a screw and an adhesive; and
attaching a case accommodating an inertial sensor, to the substrate, wherein
the case is provided with a first attachment part,
the substrate is provided with a second attachment part,
in the attaching the case, the first attachment part and the second attachment part are fitted together to attach the case to the substrate,
the inertial sensor includes
a base part,
a vibrating arm coupled to the base part,
a physical quantity detection element arranged at the vibrating arm, and
a mass part arranged at the vibrating arm, and
the mass part is made of a non-magnetic material.

3. The method for installing the inertial sensor unit according to claim 1, wherein
the mass part is made of phosphor bronze, aluminum, manganese, platinum, copper, gold, silver, zinc, lead, or glass.

4. The method for installing the inertial sensor unit according to claim 1, wherein
as the magnet, three or more magnets are provided,
in the attaching the case, the case is attached to the substrate in such a way that the inertial sensor is surrounded by a line connecting the three or more magnets, as viewed in a plan view from a direction in which the substrate and the case overlap each other.

5. The method for installing the inertial sensor unit according to claim 1, wherein
in the attaching the substrate, the substrate is attached in such a way that an adjustment plate is located between the magnet and the structure, and
the adjustment plate is made of a material that is not mutually attractive to the magnet and not mutually repellent to the magnet.

6. An inertial sensor unit comprising:
a substrate;
a magnet provided at the substrate and attaching the substrate to a structure, the magnet being attached to the substrate with a screw and an adhesive; and
a case accommodating an inertial sensor, wherein
the case is provided with a first attachment part,
the substrate is provided with a second attachment part,
the first attachment part and the second attachment part are fitted together,
the inertial sensor includes
a base part,
a moving part coupled to the base part, a physical quantity detection element arranged at the moving part, and a mass part arranged at the moving part, and the mass part is made of a non-magnetic material.

7. The inertial sensor unit according to claim 6, wherein the mass part is made of phosphor bronze, aluminum, manganese, platinum, copper, gold, silver, zinc, lead, or glass.

8. The inertial sensor unit according to claim 6, wherein as the magnet, three or more magnets are provided, and the inertial sensor is surrounded by a line connecting the three or more magnets, as viewed in a plan view from a direction in which the substrate and the case overlap each other.

* * * * *